(12) United States Patent
Sekine et al.

(10) Patent No.: US 7,890,252 B2
(45) Date of Patent: Feb. 15, 2011

(54) MAP-DATA-GENERATION DEVICE AND MAP-GENERATION METHOD USED THEREFOR, AND NAVIGATION DEVICE AND ROUTE-SEARCH METHOD USED THEREFOR

(75) Inventors: Minoru Sekine, Tokyo (JP); Masaaki Ohira, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 960 days.

(21) Appl. No.: 11/739,729

(22) Filed: Apr. 25, 2007

(65) Prior Publication Data
US 2007/0250264 A1  Oct. 25, 2007

(30) Foreign Application Priority Data
Apr. 25, 2006  (JP)  .............................. 2006-120267

(51) Int. Cl.
G01C 21/00  (2006.01)
G01C 21/34  (2006.01)

(52) U.S. Cl. ........................................ 701/202; 701/209
(58) Field of Classification Search .................. None
See application file for complete search history.

(56) References Cited

U.S. PATENT DOCUMENTS 6,023,655 A * 2/2000 Nomura ...................... 701/208
6,128,573 A * 10/2000 Nomura ...................... 701/208
6,192,314 B1 2/2001 Khavakh et al.
6,233,521 B1 * 5/2001 Nomura ...................... 701/208
6,636,802 B1 * 10/2003 Nakano et al. ............... 701/208

FOREIGN PATENT DOCUMENTS

JP  2003-323112  * 11/2003
JP  2004-286524  10/2004

OTHER PUBLICATIONS

Patent Abstracts of Japan; JP2003-337034; Nov. 28, 2003.*

* cited by examiner

*Primary Examiner*—Michael J. Zanelli
(74) *Attorney, Agent, or Firm*—Brinks Hofer Gilson & Lione

(57) ABSTRACT

A map-data-generation device and a map-generation method used therefor, and a navigation device and a route-search method used therefor are provided. The map-data-generation device generates hierarchical guide-route-search-map data by using information about a road link of level 2 (reference level), the road link generating a guide-object road. A first upper-level-link-determination unit determines a level-3 link by performing level-raising processing by using level-2-link information. A second-upper-level-link-determination unit acquires a plurality of links of levels (levels 4 to 8) higher than level 3 by performing the level-raising processing by using information about the level-3 link, and specifies an upper level map to which the link belongs on the basis of the range of a distance between a departure-point link and a destination-point link.

16 Claims, 23 Drawing Sheets

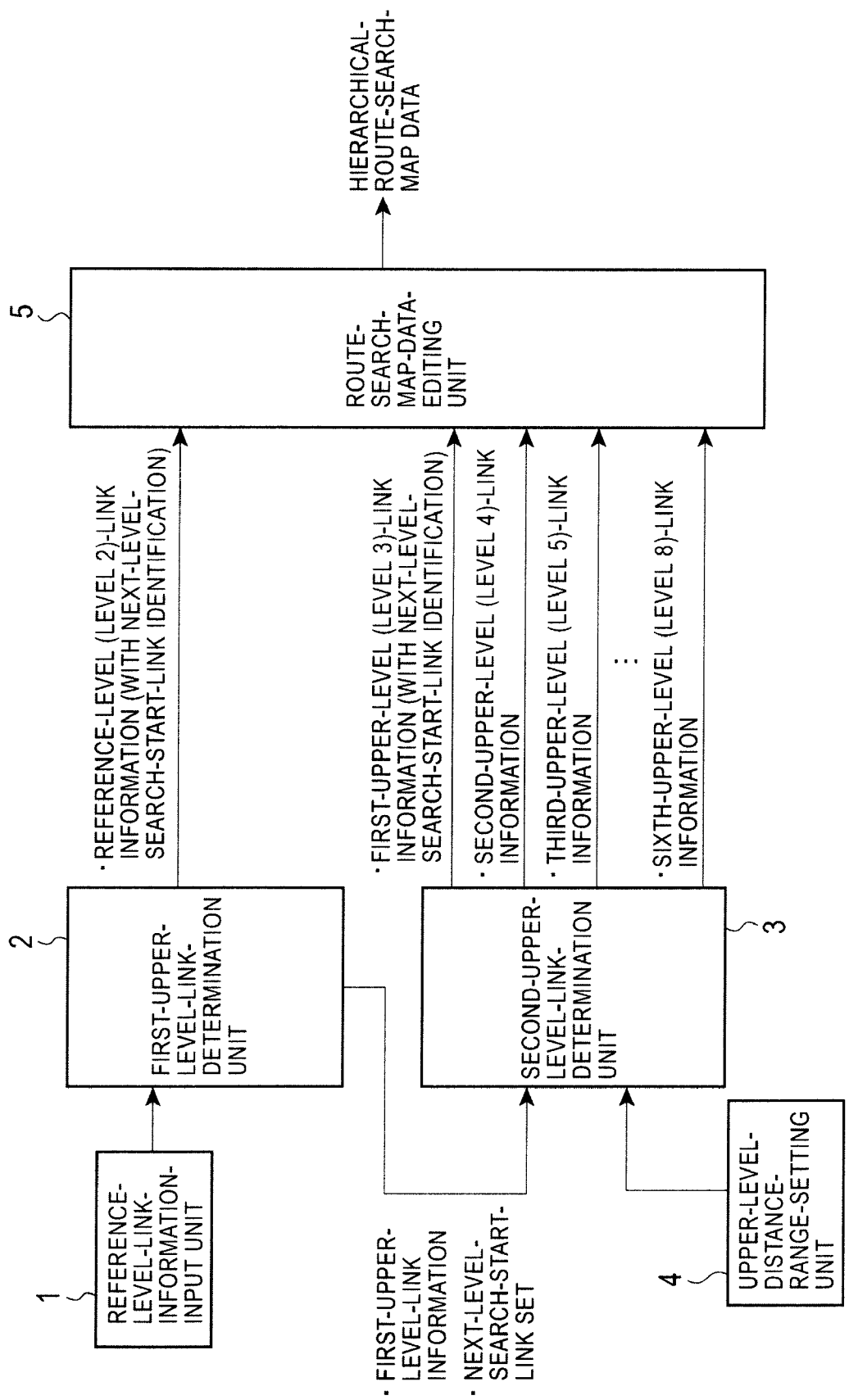

FIG. 2A

| LINK ID | |
|---|---|
| ROAD TYPE | NATIONAL ROAD |
| LINK DISTANCE | 870m |
| LANE NUMBER | 2 |
| SHAPE INFORMATION | (X1,Y1), (X2,Y2), (X3,Y3) |
| CONNECTION-LINK INFORMATION | |
| TRAFFIC-REGULATION INFORMATION | |

FIG. 2B

| LINK ID | |
|---|---|
| ROAD TYPE | |
| LINK DISTANCE | |
| LANE NUMBER | |
| SHAPE INFORMATION | |
| CONNECTION-LINK INFORMATION | |
| TRAFFIC-REGULATION INFORMATION | |
| NEXT-LEVEL-SEARCH-START FLAG | |

FIG. 2C

| LINK ID | |
|---|---|
| ROAD TYPE | |
| LINK DISTANCE | |
| LANE NUMBER | |
| SHAPE INFORMATION | |
| CONNECTION-LINK INFORMATION | |
| TRAFFIC-REGULATION INFORMATION | |
| NEXT-LEVEL-SEARCH-START FLAG | |
| NEXT LEVEL | |

| LEVEL | GENERATION CONDITIONS |
|---|---|
| LEVEL 4 | OD DISTANCE IS FROM 0 km TO 50 km |
| LEVEL 5 | OD DISTANCE IS FROM 50 km TO 100 km |
| LEVEL 6 | OD DISTANCE IS FROM 100 km TO 200 km |
| LEVEL 7 | OD DISTANCE IS FROM 200 km TO 350 km |
| LEVEL 8 | OD DISTANCE IS 350 km OR MORE |

FIG. 5

| LEVEL | GENERATION CONDITIONS |
|---|---|
| LEVEL 1 | NETWORK INCLUDING ALL OF GUIDE-OBJECT ROADS AND NON-GUIDE-OBJECT ROADS |
| LEVEL 2 (REFERENCE LEVEL) | NETWORK INCLUDING ALL OF GUIDE-OBJECT ROADS |
| LEVEL 3 (FIRST-UPPER LEVEL) | NETWORK OF ROAD SELECTED THROUGH LEVEL RAISE 1 PERFORMED WITH REFERENCE TO LEVEL 2 |
| LEVEL 4 (SECOND-UPPER LEVEL) | NETWORK OF ROAD SELECTED THROUGH LEVEL RAISE 2 PERFORMED WITH REFERENCE TO LEVEL 3 |
| LEVEL 5 (THIRD-UPPER LEVEL) | NETWORK OF ROAD SELECTED THROUGH LEVEL RAISE 2 PERFORMED WITH REFERENCE TO LEVEL 3 |
| LEVEL 6 (FOURTH-UPPER LEVEL) | NETWORK OF ROAD SELECTED THROUGH LEVEL RAISE 2 PERFORMED WITH REFERENCE TO LEVEL 3 |
| LEVEL 7 (FIFTH-UPPER LEVEL) | NETWORK OF ROAD SELECTED THROUGH LEVEL RAISE 2 PERFORMED WITH REFERENCE TO LEVEL 3 |
| LEVEL 8 (SIXTH-UPPER LEVEL) | NETWORK OF ROAD SELECTED THROUGH LEVEL RAISE 2 PERFORMED WITH REFERENCE TO LEVEL 3 |

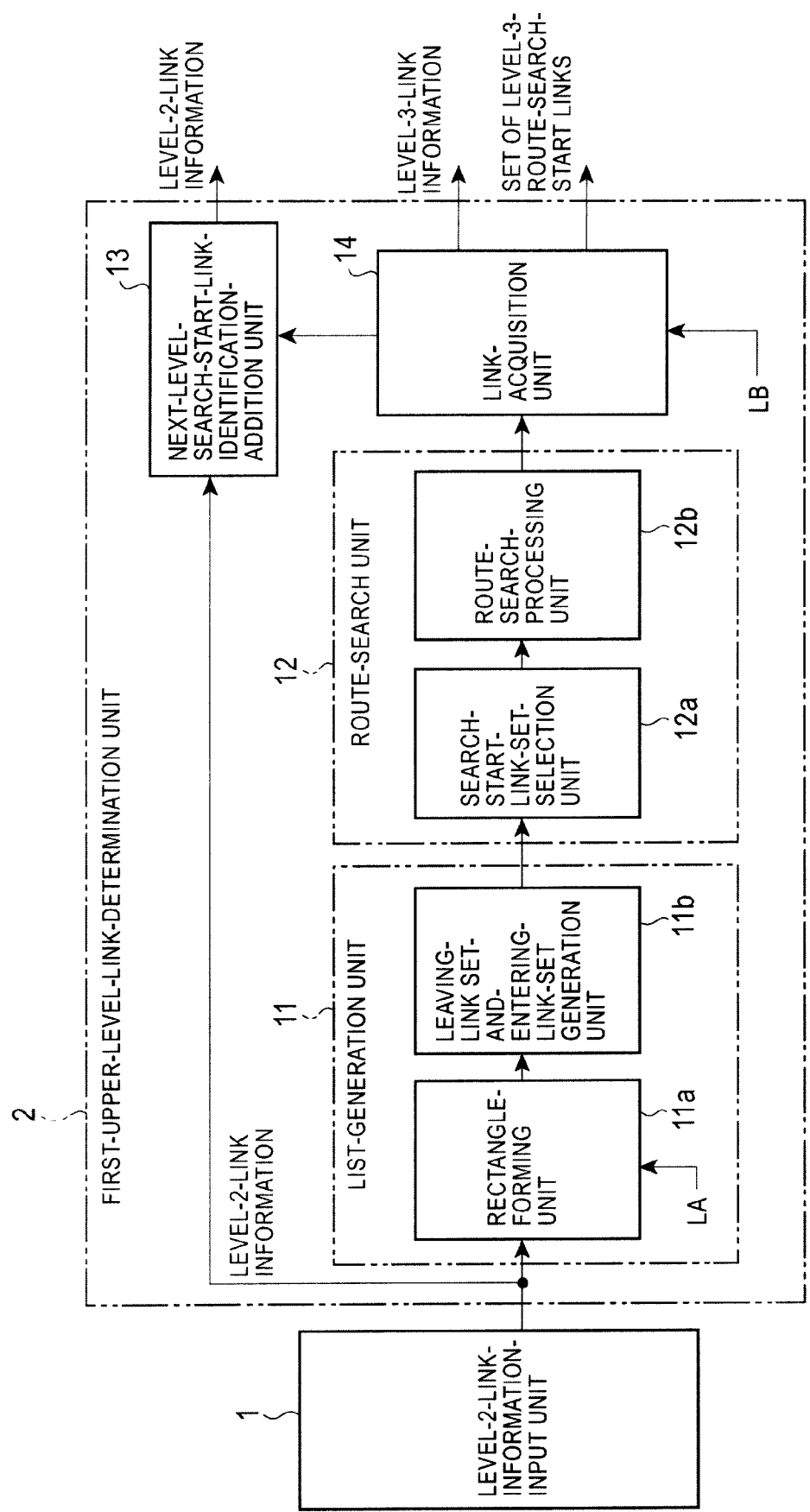

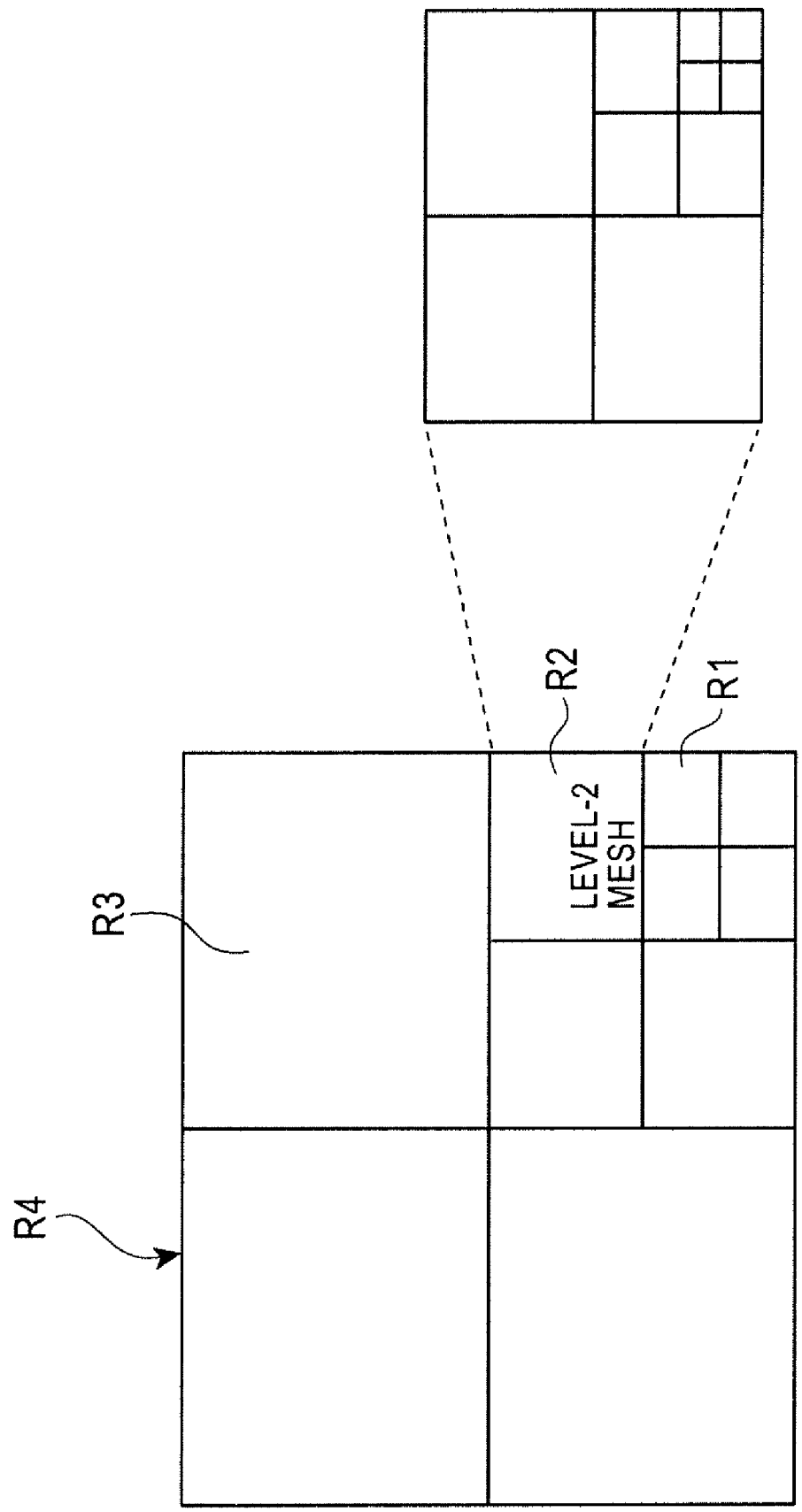

FIG. 24

| SEARCH METHOD | SEARCH TIME (INDEX OF TIME REQUIRED TO MAKE SEARCH FOR SINGLE ROUTE) | SEARCH-DATA AMOUNT (MEASURED DATA AMOUNT) | DIFFERENCE AMOUNT (MEASURED VALUE OF DIFFERENCE-DATA AMOUNT OF SEARCH DATA OBTAINED WHEN TWO ROUTES ARE ADDED) | QUALITY OF ROUTE OBTAINED THROUGH STATIC SEARCH | QUALITY OF ROUTE OBTAINED THROUGH DYNAMIC SEARCH |
|---|---|---|---|---|---|
| LOW-DIFFERENCE-HIGH-SPEED-SEARCH TYPE | ○ (2 SECONDS) | ◎ (0.53G) | ◎ (55K) | ◎ | ◎ |
| SPECIAL-PURPOSE NETWORK TYPE | ◎ (1 SECOND) | × (1.95G) | × (287M) | ◎ | ○ |
| NORMAL-HIERARCHICAL TYPE | × (4 SECONDS) | ◎ (−) | ◎ (−) | × | × |

| LEVEL 1 BASE UNIT | EXPANSION UNIT |
|---|---|
| LEVEL 2 BASE UNIT | EXPANSION UNIT |
| LEVEL 3 BASE UNIT | |
| LEVEL 4 BASE UNIT | |
| LEVEL 5 BASE UNIT | |
| SPECIAL-PURPOSE NETWORK | EXPANSION UNIT |

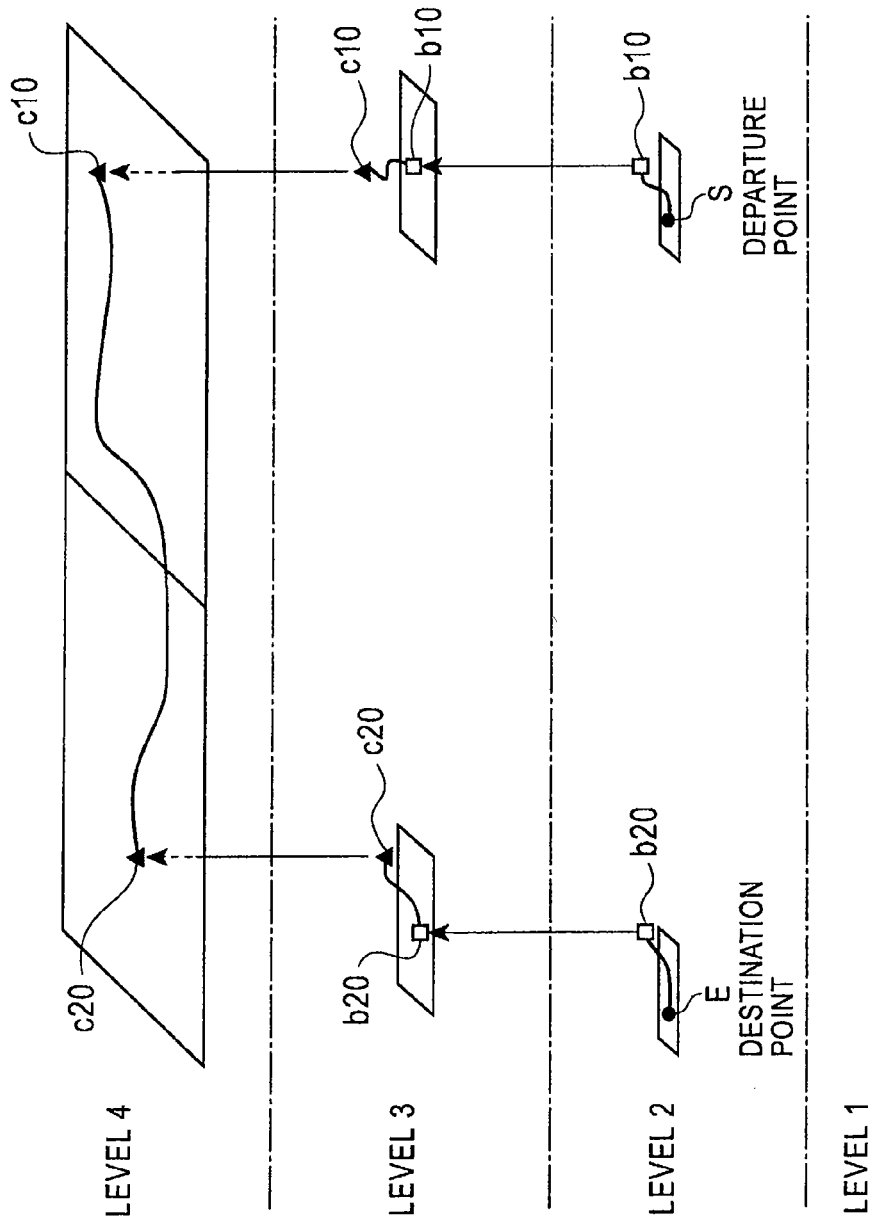

MAP-DATA-GENERATION DEVICE AND MAP-GENERATION METHOD USED THEREFOR, AND NAVIGATION DEVICE AND ROUTE-SEARCH METHOD USED THEREFOR

RELATED APPLICATIONS

The present application claims priority to Japanese Patent Application Serial Number 2006-120267, filed on Apr. 25, 2006, the entirety of which is hereby incorporated by reference.

BACKGROUND OF THE INVENTION

1. Field of the Invention

The present invention relates to a map-data-generation device and a map-generation method used therefor, and a navigation device and a route-search method used therefor, and particularly relates to a map-data-generation device generating hierarchical guide-route-search-map data by using information about a road link of a reference level and a map-generation method used therefor, and a navigation device making a search for a route to a destination point by using the map data, and a route-search method used therefor.

2. Description of the Related Art

A navigation device reads map data generated in accordance with the current position of a vehicle from a map-storage medium including a compact disk (CD)-read only memory (ROM), a digital-versatile disk (DVD), a hard-disk drive (HDD), and so forth and produces an image of the map data on a display screen. Further, the navigation device displays a vehicle mark on the display screen at a fixed position and displays the map image in a scrolling manner according to the travel state of the vehicle. Further, the navigation device has a route-guide function, so as to make a search for a guide route extending from a departure point to a destination point and/or a guide route extending from the departure point to the destination point via a predetermined transit point, and produce an image of the guide route on the map image. There has been disclosed a method of storing information about a special-purpose mesh-to-mesh network in map data, decreasing the number of search branches by using the special-purpose network, and making the route search with high speed, as a known technology 1 which allows for making the route search with high speed (Japanese Unexamined Patent Application Publication No. 2003-337034). Further, there has been disclosed a known technology 2 which allows for making the route search with high speed by using hierarchical map data in place of the special-purpose network (Japanese Unexamined Patent Application Publication No. 2004-286524).

According to the known technology 1, five levels are provided according to the detail degree of the map, as shown in FIG. 25A, and road information of the map includes information about roads of the levels and the special-purpose-network information. A basic unit of each of the levels is configured to specify the road information corresponding to a road existing in the area corresponding to the level. Each of the expansion parts of levels 1 and 2 has an associated information part provided, so as to make a search with high speed. The special-purpose network includes route information (information about a link and/or a node) required to make a search for a route connecting arbitrary two level-2 areas to each other in association with a combination of the above-described level-2 areas.

When a departure point S is determined, as shown in FIG. 25B, a level-1 area A1 including the departure point S and a level-2 area C1 including the level-1 area A1 are determined. Likewise, when a destination point E is determined, a level-1 area A2 including the destination point and a level-2 area C2 including the level-1 area A2 are determined. Since information about the special-purpose network is provided in accordance with a combination of the two level-2 areas C1 and C2, the route search is made by using the special-purpose-network information. More specifically, information about the upper-transition nodes P11, P12, and P13 corresponding to the departure point, and the upper-transition nodes Q11, Q12, and Q13 corresponding to the destination point is extracted by using level-1-map information and expansion information of the special-purpose network. Then, a search for a plurality of routes between upper nodes N11, N12, and N13, and upper nodes M11, M12, and M13 corresponding to the upper-transition nodes is made by using special-purpose-network information (information about links and/or nodes), and a route requiring the minimum cost of all of the routes is determined to be a guide route.

According to the known technology 2, the road information is shown by using levels 1 to 4 provided so that the map data is hierarchically configured, as shown in FIG. 26. Level 1 denotes part specifying map information indicating a guide-route-object road, and a non-guide-route-object road (narrow street), level 2 denotes part specifying information about the guide-route-object road, level 3 denotes part specifying map information indicating a primary road, and level 4 denotes part specifying map information indicating a more primary road (a prefectural road, a national road, and an expressway). When the departure point S and the destination point E are determined, a node b10 making its transition from the departure point S to a level-3 upper node is obtained on level 2. Next, a node c10 making its transition from the node b10 to a level-4 upper node is obtained, and a route extending from the departure point S to the upper node c10 is obtained. Likewise, a route extending from the destination point E to an upper node C20 of the uppermost level 4 is obtained. Next, a search for a route extending from the upper node c10 on the departure-point side to the upper node c20 on the destination-point side is made by using level-4-road information. Eventually, a search for a route that extends from the departure point to the destination point and that requires the minimum cost is made.

Since the known technology 1 is achieved by using a large number of special-purpose networks, the size of road information increases. Further, when the map data is updated by generating difference data, the amount of difference data of the special-purpose-network information increases, which increases the communication time required to acquire the difference data through communications. Subsequently, the communication cost and the map-update time are increased.

According to the hierarchical route search disclosed in the known technology 2, the levels are determined on the basis of hierarchical information including information about the road type or the like. Therefore, the quality of a road obtained through the hierarchical search is lower than that of a route obtained through a search made on the lower-most level (a level where information about all of the route-guide-object roads is stored).

SUMMARY OF THE INVENTION

Accordingly, the present invention allows for making a route search with high speed and increasing the route quality.

Further, when updating map data by generating data on the difference between a new map and an old map, the present invention allows for decreasing the difference data in size and time required to update the map data.

Map-data-generation Method

According to a first aspect of the present invention, there is provided a map-data-generation method capable of generating hierarchical guide-route-search-map data by using information about a road link of a reference level, the road link generating a guide-object road. The map-data-generation method includes a first step of determining at least one link of a first upper level higher than the reference level by performing "level-raising processing," or processing associated with moving from a current level map to a higher level map, by using the reference-level-road-link information, and specifying at least one link functioning, as a route-search-start link of the first upper level, and a second step of performing the level-raise or level altering processing by using information about the first-upper-level link so that links of a plurality of upper levels higher than the first-upper level are determined, and specifying at least one link functioning as a route-search-start link of the upper level. The plurality of upper levels is set according to a distance range between a departure-point link and a destination-point link.

The first step of the map-data-generation method includes a first sub-step of dividing at least one mesh of the reference level, making the number of links provided in the divided areas equivalent to or lower than a predetermined number, and generating a list of at least one link leaving each of the divided areas, a second sub-step of determining all of links leaving at least one predetermined divided area to be a set of search-start links and performing route-search processing in a forward direction, so as to make a search for routes extending from the search-start set to all of links leaving all of the divided areas, a third sub-step of acquiring links generating the routes obtained through the search, where the number of the acquired links is equivalent to or smaller than a predetermined link number, the predetermined link number denoting the number of links from a route-start link to a predetermined link, and where the number of search branches required to make the route search is equivalent to or larger than a predetermined branch number, as the first-upper-level links, and specifying a link which is the closest to the route-start link of all of the acquired links, as a route-search-start link of the first-upper level, and a fourth sub-step of performing the second and third sub-steps for the search-start-link set of each of the divided areas so that the first-upper-level links and the first-upper-level-route-search-start links are determined.

The first step further includes a fifth sub-step of generating a list of at least one link entering each of the divided areas, a sixth sub-step of determining all of the links entering the predetermined divided area to be the search-start-link set and performing the route-search processing in a backward direction, so as to make a search for routes extending from the search-start-link set to all of the links entering all of the divided areas, a seventh sub-step of acquiring links generating the routes obtained through the search, where the number of the acquired links is equivalent to or smaller than a predetermined link number, the predetermined link number denoting the number of links from a route-start link to a predetermined link, and where the number of search branches required to make the route search is equivalent to or larger than a predetermined branch number, as the first-upper-level links, and specifying a link which is the closest to the route-start link of all of the acquired links, as a route-search-start link of the first-upper level, and an eighth sub-step of performing the sixth and seventh sub-steps for the search-start-link set of each of the divided areas so that the first-upper-level links and the first-upper-level-route-search-start links are determined.

The second step of the map-data-generation method includes a ninth sub-step of determining all of the first-upper-level-route-search-start links obtained for the predetermined divided area to be the search-start-link set of the first level, and performing the route-search processing in the forward direction, so as to make a search for routes extending from the search-start-link set to all of the first-upper-level-route-search-start links, a tenth sub-step of acquiring links generating the routes obtained through the search, where the number of the acquired links is equivalent to or smaller than a predetermined link number, the predetermined link number denoting the number of links from a route-start link to a predetermined link, and where the number of search branches required to make the route search is equivalent to or larger than a predetermined branch number, and specifying a link which is the closest to the route-start link of all of the acquired links, as a route-search-start link of a next level, an eleventh sub-step of determining to which of the upper levels the obtained link should belong on the basis of a distance between the route-start-point link and a route-terminal-point link, and a twelfth sub-step of performing the sub-steps 9, 10, and 11 for the first-upper-level-search-start-link set of each of the divided areas, so as to specify links of a second-upper level, a third-upper level, and so forth, and the route-search-start link of each of the upper levels.

The second step further includes a thirteenth sub-step of determining all of the first-upper-level-route-search-start links obtained, at the seventh sub-step, for the predetermined divided area to be the search-start-link set of the first level, performing the route-search processing in the backward direction, so as to make a search for routes extending from the search-start-link set to all of the first-upper-level-route-search-start links, a fourteenth sub-step of acquiring links generating the routes obtained through the search, where the number of the acquired links is equivalent to or smaller than a predetermined link number, the predetermined link number denoting the number of links from a route-start link to a predetermined link, and where the number of search branches required to make the route search is equivalent to or larger than a predetermined branch number, and specifying a link which is the closest to the route-start link of all of the acquired links, as a route-search-start link of a next level, a fifteenth sub-step of determining to which of the upper levels the obtained link should belong on the basis of a distance between the route-start link and a route-terminal-point link, and a sixteenth sub-step of performing the sub-steps 13 to 15 for the first-upper-level-search-start-link set of each of the divided areas, so as to specify links of a second-upper level, a third-upper level, and so forth, and the route-search-start link of each level.

According to a second aspect of the present invention, there is provided a map-data-generation device configured to generate hierarchical guide-route-search-map data by using information about a road link of a reference level, the road link generating a guide-object road. The map-data-generation device includes a first link-determination unit configured to determine at least one link of a first upper level higher than the reference level by performing level-raising or higher map level related processing by using the reference-level-road-link information, and specify at least one link functioning, as a route-search-start link of the first upper level, and a second link-determination unit configured to perform the level-raising or higher map level related processing by using information about the first-upper-level link so that links of a plurality of upper levels including a second upper level, a third-upper level, and so forth, that are higher than the first-upper level are determined, and specify at least one link functioning, as a route-search-start link of each of the second-upper level, a third-upper level, and so forth, and an upper-level-setting unit configured to set a distance range of each of the plurality of upper levels so that an upper level to which a predetermined link used for making the route search belongs can be determined on the basis of a distance between a departure-point link and a destination-point link.

The first-step-determination unit includes a list-generation unit configured to divide at least one mesh of the reference level, make the number of links provided in the divided areas equivalent to or lower than a predetermined number, and generate a list of at least one link leaving each of the divided areas, a route-search unit configured to determine all of the links leaving at least one predetermined divided area to be a set of search-start links and perform route-search processing in a forward direction, so as to make a search for routes extending from the search-start set to all of the links leaving all of the divided areas, and a link-acquisition unit that is configured to acquire links generating the routes obtained through the search, where the number of the acquired links is equivalent to or smaller than a predetermined link number, the predetermined link number denoting the number of links from a route-start link to a predetermined link, and where the number of search branches required to make the route search is equivalent to or larger than a predetermined branch number, as the first-upper-level links, and that is configured to specify a link which is the closest to the route-start link of all of the acquired links, as a route-search-start link of the first-upper level. The first-upper-level links and the first-upper-level-route-search-start links are determined for the search-start-link set of each of the divided areas.

In the first link-determination unit, the list-generation unit generates a list of at least one link entering each of the divided areas, the route-search unit determines all of links entering the predetermined divided area to be the search-start-link set and performs the route-search processing in a backward direction, so as to make a search for routes extending from the search-start-link set to all of links entering all of the divided areas, and the link-acquisition unit acquires links generating the routes obtained through the search, where the number of the acquired links is equivalent to or smaller than a predetermined link number, the predetermined link number denoting the number of links from a route-start link to a predetermined link, and where the number of search branches required to make the route search is equivalent to or larger than a predetermined branch number, as the first-upper-level links, and specifies a link which is the closest to the route-start link of all of the acquired links, as a route-search-start link of the first-upper level.

The second link-determination unit includes a route-search unit configured to determine all of the first-upper-level-route-search-start links obtained for the predetermined divided area to be the search-start-link set, and perform the route-search processing, so as to make a search for routes extending from the search-start-link set to all of the first-upper-level-search-start links, a link-acquisition unit that is configured to acquire links generating the routes obtained through the search, where the number of the acquired links is equivalent to or smaller than a predetermined link number, the predetermined link number denoting the number of links from a route-start link to a predetermined link, and where the number of search branches required to make the route search is equivalent to or larger than a predetermined branch number, and that is configured to specify a link which is the closest to the route-start link of all of the acquired links, as a route-search-start link of a next level, and a link-level-determination unit configured to determine to which of the upper levels the obtained link should belong on the basis of a distance between the route-start link and a route-terminal-point link. Links of a second-upper level, a third-upper level, and so forth, and the route-search-start link of each level are specified for the first-upper-level-search-start-link set obtained for each of the divided areas.

Route-search Method

According to a third aspect of the present invention, there is provided a route-search method used for a navigation device configured to make a search for a route to a destination point. The route-search method includes the steps of storing hierarchical guide-route-search-map data in a map-data-storage unit, where the hierarchical guide-route-search-map data includes information about a road link of a reference level, link information of a first upper level, the first-upper-level-link information being obtained by performing level-raising or higher map level related processing by using the reference-level-road-link information, and information about a plurality of links of a second-upper level, a third-upper level, and so forth, the link information being obtained by performing the level-raising processing by using the first-upper-level-link information, calculating a slant distance between a departure point and the destination point when the destination point is set, determining an upper level other than the first-upper level on the basis of the slant distance, where a link used for performing route-search processing belongs to the determined upper level, making a search for a route to a link that can be shifted to the first-upper level on the reference level, making a search for a route to a link that can be shifted to the determined still-higher level on the first-upper level, and performing the route-search processing by using information about a link of the upper level.

Navigation Device

According to a fourth aspect of the present invention, there is provided a navigation device configured to make a search for a route to a destination point. The navigation device includes a map-data-storage unit configured to store hierarchical guide-route-search-map data including information about a road link of a reference level, information about a link of a first upper level, the first-upper-level-link information being obtained by performing level-raising or higher map level associated processing by using the reference-level-road-link information, and information about a plurality of links of a second-upper level, a third-upper level, and so forth, the link information being obtained by performing the level-raising or higher map level related processing by using the first-upper-level-link information, a destination-setting unit configured to set the destination point, and a route-search unit configured to determine an upper level other than the first-upper level on the basis of a slant distance between a departure point to the destination point, where a link used for performing route-search processing belongs to the determined upper level, make a search for a route to a link that can be shifted to the first-upper level on the reference level, make a search for a route to a link that can be shifted to the determined still-higher level on the first-upper level, and perform the route-search processing by using information about a link of the upper level.

According to the present invention, a link of an upper level is determined through the level-raising processing. Further, the levels are not determined on the basis of hierarchical information such as information about the road type, which is different from the cases where known technologies are used. Subsequently, the present invention allows for increasing the quality of a route obtained through the search.

Further, the present invention allows for setting the plurality of upper levels according to the range of a distance between the departure-point link and the destination-point link, and decreasing the number of links as the level becomes higher by performing the level-raising processing. Subsequently, the present invention allows for making the route search with high speed by using a link of an upper level determined on the basis of the distance between the departure point and the destination point for which the route search is made.

The present invention further allows for performing the level-raising processing, so as to upgrade a link with search branches of which number is larger than a predetermined number, as an upper-level link (a next-level-route-search-start link), and generating the route-search-map data, so as to identify the next-level-route-search-start link. Therefore, when a reference-level search is made until the time where the search-branch number attains a predetermined branch number, it becomes possible to determine which link should be used, so as to start making the route search on the upper level, with stability, and perform the route-search processing with high speed.

The present invention further allows for determining an upper-level link through the level-raising processing. Since the present invention can be achieved without generating a special-purpose network, which is different from the cases where known technologies are used, it becomes possible to decrease the size of the route-search-map data. Further, the present invention allows for decreasing the size of data on a difference between new map data and old map data, as compared with that of difference data obtained in the cases where known technologies are used. Subsequently, the time required to update the map data can be decreased.

BRIEF DESCRIPTION OF THE DRAWINGS

FIG. 1 shows the configuration of a map-generation device according to an embodiment of the present invention;

FIG. 2A illustrates link information (link record);

FIG. 2B also illustrates the link information (link record);

FIG. 2C also illustrates the link information (link record);

FIG. 5 illustrates hierarchical route-search-map data;

FIG. 6 is a block diagram of a first upper-level-link-determination unit;

FIG. 7 illustrates rectangle-division processing;

FIG. 24 illustrates comparisons between the performance capabilities of an embodiment of the present invention (a low-difference-high-speed-search system), a known technology 1 (a special-purpose-network-search system), and a known technology 2 (a normal-hierarchical-search system);

FIG. 26 illustrates the known technology 2.

DESCRIPTION OF THE PREFERRED EMBODIMENTS (A) Map-generation Device (a) General Configuration FIG. 1 shows the configuration of a map-generation device according to an embodiment of the present invention. The map-generation device includes a link-information-input unit 1 configured to generate level-2 (reference-level)-link information, a first upper-level-link-determination unit 2, a second upper-level-link-determination unit 3, an upper-level-distance-range-setting unit 4 configured to set an upper-level-distance range, and a route-search-map-data-editing unit 5 configured to edit and produce hierarchical map data used for making a route search.

Figures 3, 4:
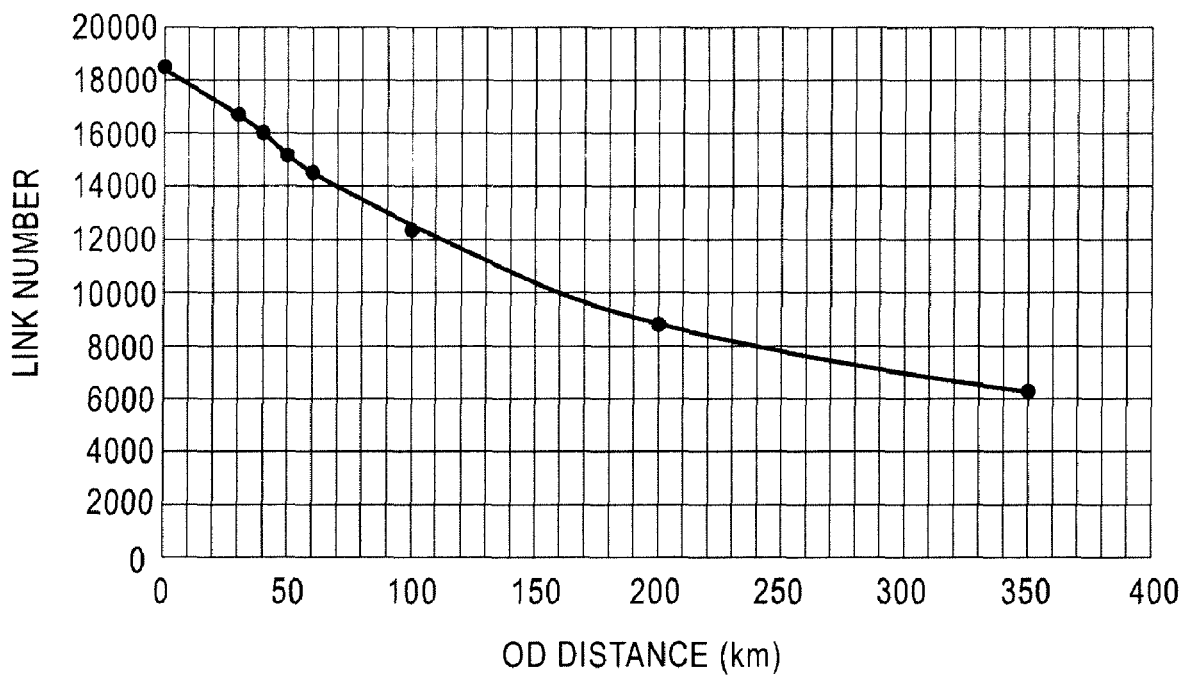
FIG. 3 illustrates levels 4, 5, 6, 7, and 8, and the ranges of slant distance $L_{OD}$ in association with one another.
FIG. 4 shows the correspondence between the slant distance $L_{OD}$ and the number of links included in the level corresponding to the slant distance $L_{OD}$.

The first upper-level-link-determination unit 2 performs level-raise processing 1 by using level-2-road-link information and determines a link of level 3 (the first upper level) higher than level 2. Further, the first upper-level-link-determination unit 2 specifies a link that can function, as a route-search-start link, while making a route search of level 3. That is to say, the first upper-level-link-determination unit 2 performs the following processing procedures including the steps of: (1) determining the link of level 3, (2) adding a flag to the level-2-road-link information, so as to identify whether or not the link is a route-search-start link of level 3, and transmitting the level-2-road-link information to the route-search-map-data-editing unit 5, and (3) transmitting information about the link of level 3 and a next-level-search-start-link set to the second upper-level-link-determination unit 3.

Each of FIGS. 2A, 2B, and 2C illustrates link information (link record). FIG. 2A shows level-2-link information transmitted from the link-information-input unit 1, FIG. 2B shows the level-2-link information to which the identification flag transmitted from the first upper-level-link-determination unit 2 is added, and FIG. 2C shows the level-3-link information that is transmitted from the second upper-level-link-determination unit 3 and that will be described later. The level-2-link information shown in FIG. 2A includes (1) information about a link ID, (2) information about the road type, (3) information about the link distance, (4) information about the lane number, (5) shape information determining the link shape (data on the positions of a start node, a mid-point node, and an end-point node), (6) connection-link information, (7) traffic-regulation information, and so forth. The level-2-link information shown in FIG. 2B includes (8) an identification flag indicating whether or not the level-3 link can function, as the route-search-start link, during the level-3-route search, in addition to the information items (1) to (7). Here, the link-data items of level 2 are generated in association with the mesh numbers. Therefore, it becomes possible to determine the number of a mesh to which the link belongs.

The second upper-level-link-determination unit 3 performs the level-raise processing 2 by using the level-3-link information, determines links of a plurality of upper levels (levels 4 to 8) higher than level 3, and specifies route-search-start links of levels 4 to 8. Each of levels 4 to 8 corresponds to the range of a slant distance $L_{OD}$ between a departure-point link and a destination-point link. There is correspondence between each of the levels and the slant-distance range, as shown in FIG. 3. Namely, when a link of level 4 is used, the range of the slant distance $L_{OD}$ corresponds to from 0 km to 50 km. When a link of level 5 is used, the range of the slant distance $L_{OD}$ corresponds to from 50 km to 100 km. When a link of level 6 is used, the range of the slant distance $L_{OD}$ corresponds to from 100 to 200 km. When a link of level 7 is used, the range of the slant distance $L_{OD}$ corresponds to from 200 to 350 km. When a link of level 8 is used, the range of the slant distance $L_{OD}$ corresponds to 350 km or more. Information about the correspondences between the above-described levels 4 to 8 and the distance range is set and transmitted to the second upper-level-link-determination unit 3 by the upper-level-distance-range-setting unit 4. FIG. 4 shows the correspondence between the slant distance $L_{OD}$ and the number of at least one link included in the level corresponding to the slant distance $L_{OD}$. As the level becomes higher, the number of links decreases so that a high-speed-route search can be made on the higher level.

The second upper-level-link-determination unit 3 acquires link information from level 3 to level 8 on the basis of a result of the level-raise processing 2, and transmits the link information to the route-search-map-data-editing unit 5. Here, the level-3-link information includes a flag identifying whether or not the link is a route-search-start link of the next level (levels 4 to 8) and data specifying the next level in addition to the level-2-link information including the above-described data items (1) to (7), as shown in FIG. 2C.

The route-search-map-data-editing unit 5 generates and produces hierarchical route-search-map data by using information about links of the levels, the link information being transmitted from the first and second upper-level-link-determination units 2 and 3. FIG. 5 illustrates the hierarchical route-search-map data including networks of from level 1 to level 8. Level 1 corresponds to a part (network) specifying map information about a guide-route-object road and a non-guide-route-object road, level 2 corresponds to a network specifying road information about the guide-route-object road, and level 3 corresponds to a network including link information selected through the level-raising processing 1 performed with reference to level 2. Each of the levels from level 4 to level 8 corresponds to a network including link information selected through the level-raising processing 2 performed with reference to level 3.

(b) The First Upper-level-link-determination Unit

FIG. 6 is a block diagram of the first upper-level-link-determination unit 2 including a list-generation unit 11, a route-search unit 12, a next-level-search-start-link-identification-and-addition unit 13, and a link-acquisition unit 14.

List-generation Unit

In the list-generation unit 11, a rectangle-forming unit 11a divides a mesh of level 2 into rectangles so that the number of links existing in the rectangle range becomes equivalent to or smaller than a set number LA (one hundred, for example). FIG. 7 is a map illustrating the rectangular-division processing. The map is hierarchically generated and divided into a level-4 mesh, a level-3 mesh, a level-2 mesh, and a level-1 mesh according to the size of an area for covering. The area R4 corresponding to the level-4 mesh includes a plurality of (four in FIG. 7) areas R3 of the level-3 mesh. Likewise, the area R3 corresponding to the level-3 mesh includes four areas R2 of the level-2 mesh, and the area R2 corresponding to the level-2 mesh includes four areas R1 of the level-1 mesh. The rectangular-forming unit 11a divides the area R2 corresponding to the level-2 mesh into basic rectangles so that the number of belonging links is equivalent to or smaller than LA. Here, a link extending over the rectangles is determined to be the belonging link.

Figure 8A:
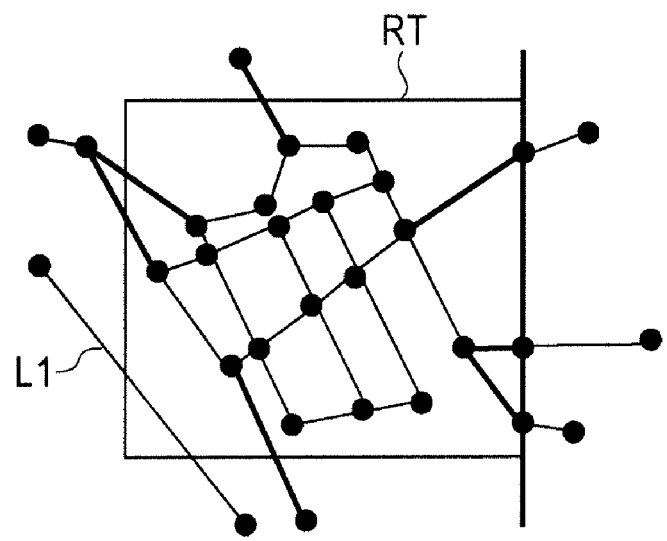
FIG. 8A illustrates operations performed by a list-generation unit.
Figure 8B:
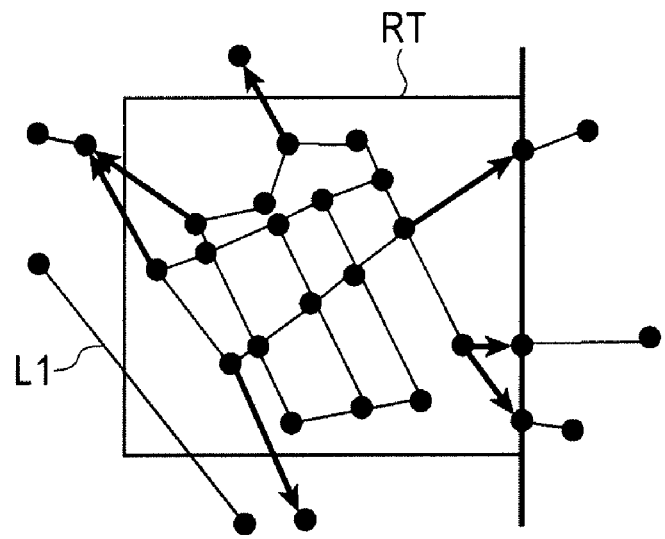
FIG. 8B also illustrates the operations performed by the list-generation unit.
Figure 8C:
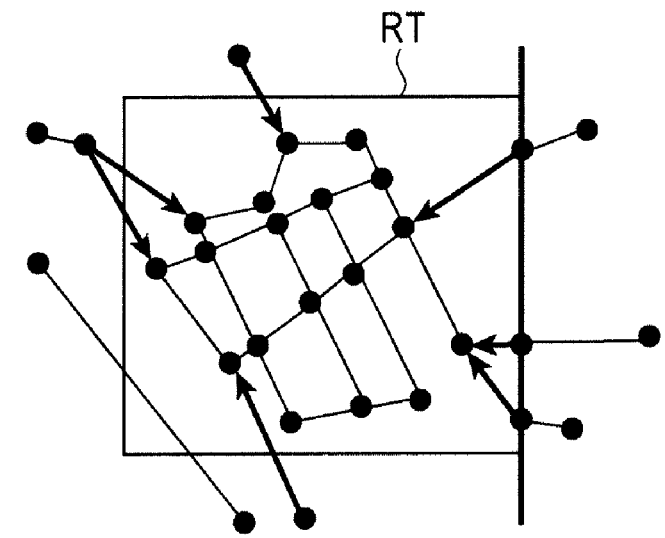
FIG. 8C also illustrates the operations performed by a list-generation unit.

A link-set-generation unit 11b generates a set of links for each of the rectangles, the links leaving the rectangle (a set of search-start links extending in a forward direction) and a set of links for each of the rectangles, the links entering the rectangle (a set of search-start links extending in an entering direction). Each of FIGS. 8A, 8B, and 8C illustrates operations performed by the link-set-generation unit 11b. First, the link-set-generation unit 11b extracts a boundary link extending over the rectangles, as shown in FIG. 8A. When the link extends over the rectangles, either the point where the link starts or the point where the link ends exists in one of the rectangles, or on the boundary between the rectangles. Since both the departure point and the end point of a link L1 do not exist in the rectangle, the link L1 is not a link extending over the rectangles. Next, all of the above-described links extracted from a predetermined rectangle are determined to be a set of search-start links. When the set of search-start links is used, so as to make a route search in the leaving direction (forward direction), as shown in FIG. 8B, the set of search-start links functions, as a set of leaving-direction-search-start links. When the set of search-start links is used, so as to make a route search in the entering direction (backward direction), as shown in FIG. 8C, the set of search-start links functions, as a set of backward-direction-search-start links.

Route-search Unit

Figure 9:
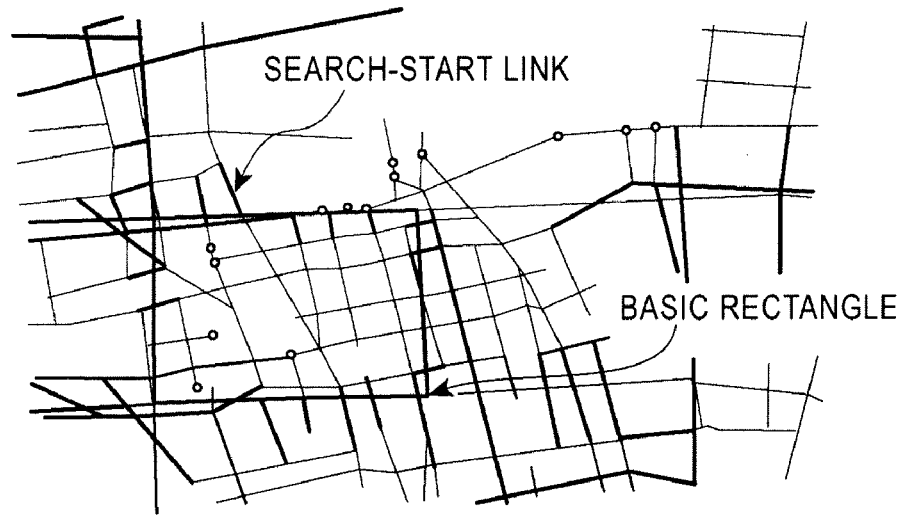
FIG. 9 illustrates a basic rectangle and a search-start-link set.

In the route-search unit 12, a search-start-link-set-selection unit 12a selects a set of forward-direction-search-start links, the links being extracted from a predetermined rectangle, as shown in FIG. 9, and a route-search-processing unit 12b makes a route search in a forward direction for all of the links generating the forward-direction-search-start-link set according to a Dijkstra method until the time where a search branch can be extended only with difficulty. Then, the route-search-processing unit 12b obtains and generates information about routes extending from the search-start-link set to all of the leaving links of all of the rectangles by using information about a result of the route search. After that, the rectangle switching is performed, the above-described route-search processing is performed for a set of forward-direction-searchstart links of another rectangle, and the route-search processing is performed for the sets of forward-direction-search-start links of all of the rectangles in the above-described manner. When the route-search processing performed for all of the forward-direction-search-start-link sets is finished, the route-search processing is performed for the sets of backward-direction-search-start links of all of the rectangles in the above-described manner.

Dijkstra Method

Figure 10:
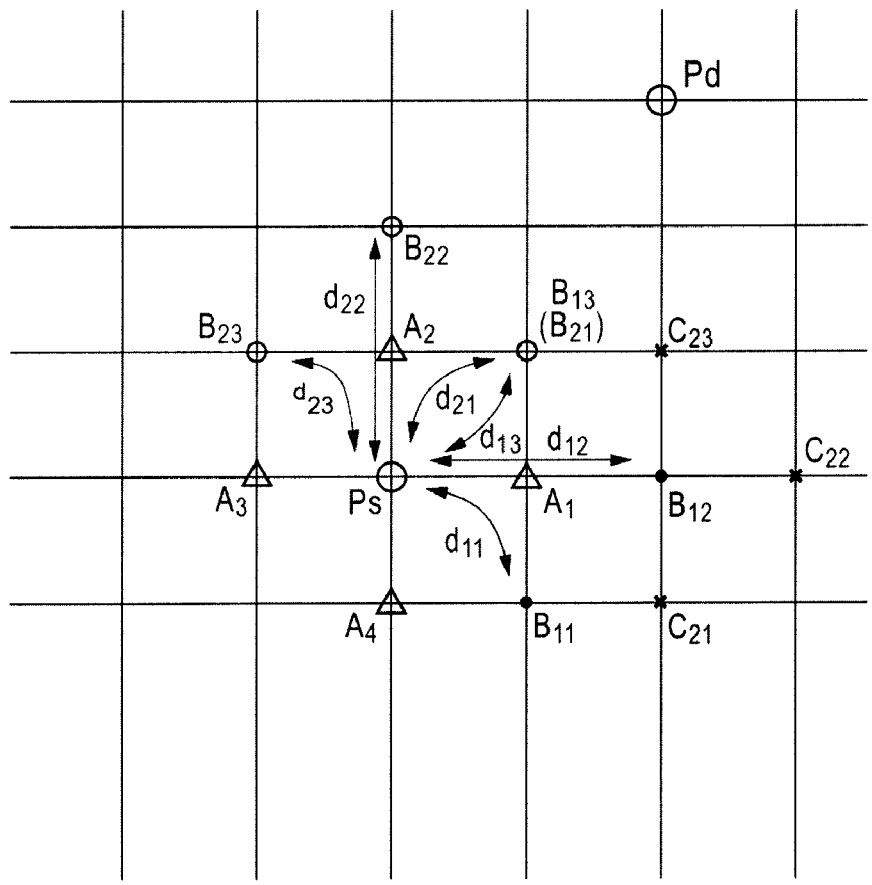
FIG. 10 shows a brief explanation of a Dijkstra method performed when the cost is determined to be a distance.

FIG. 10 is a graph generated, so as to give a brief explanation of a Dijkstra method performed when the cost is determined to be a distance. According to the above-described graph, roads are indicated by straight lines and crossroads are indicated by a point of interception of the straight lines. The distances between the crossroads are known. Point $P_s$ is determined to be a departure point (the own-vehicle position) and point $P_d$ is determined to be a destination point. According to the Dijkstra method, first-order crossroads $A_1$, $A_2$, $A_3$, and $A_4$ adjacent to the departure point $P_s$ are calculated, and information about distances from zeroth-order crossroads (the departure point) and the departure point is stored with reference to the first-order crossroads $A_1$ to $A_4$. Next, a second-order crossroads Bij is calculated for each of the first-order crossroads $A_1$ to $A_4$, and information about distances extending from the departure point via the first-order crossroads is obtained and stored with reference to each of the second-order crossroads. As for the first-order crossroads $A_1$, for example, three second-order crossroads $B_{11}$, $B_{12}$, and $B_{13}$ are calculated, and information about $B_{11}$: distance $d_{11}$ extending from the departure point via the first crossroads $A_1$, $B_{12}$: distance $d_{12}$ extending from the departure point via the first crossroads $A_1$, and $B_{13}$: distance $d_{13}$ extending from the departure point via the first crossroads $A_1$ .... (a) is stored with reference to the second-order crossroads $B_{11}$, $B_{12}$, and $B_{13}$. Further, three second-order crossroads $B_{11}$, $B_{12}$, and $B_{13}$ are calculated in relation to the first-order crossroads $A_2$ and information about $B_{21}$: distance $d_{21}$ extending from the departure point via the first crossroads $A_2$ .... (b), $B_{22}$: distance $d_{22}$ extending from the departure point via the first crossroads $A_2$, and $B_{23}$: distance $d_{23}$ extending from the departure point via the first crossroads $A_2$ is stored with reference to the second-order crossroads $B_{21}$, $B_{22}$, and $B_{23}$. Second-order crossroads are calculated for other first-order crossroads $A_3$ and $A_4$ in the above-described manner and predetermined data is stored.

The second-order crossroads $B_{13}$ and the second-order crossroads $B_{21}$ are identical with each other. When the crossroads on which data should be stored overlap each other, the distances $d_{13}$ and $d_{21}$ extending from the departure point are compared to each other in the above-described manner, and data on the shorter distance alone is stored. For example, when the expression $d_{13} > d_{21}$ holds, the data (b) is stored ultimately, as data on the second-order crossroads $B_{13}$ ($=B_{21}$)

After that, third-order crossroads Cij are calculated for each of the second-order crossroads, and the distance extending from the departure point via the second-order crossroads is calculated with reference to each of the third-order crossroads Cij and information about the distance is stored. Generally, when the (i+1)-st-order crossroads are calculated for each of the i-th-order crossroads and the cumulative distance extending from the departure point via the i-th-order crossroads is calculated with reference to each of the (i+1)-st-order crossroads and information about the cumulative distance is stored, a destination point Pd can be eventually attained. In the above-described embodiment, the Dijkstra method has been described with emphasis on nodes. However, the Dijkstra method can be described with emphasis on the links.

Figure 11:
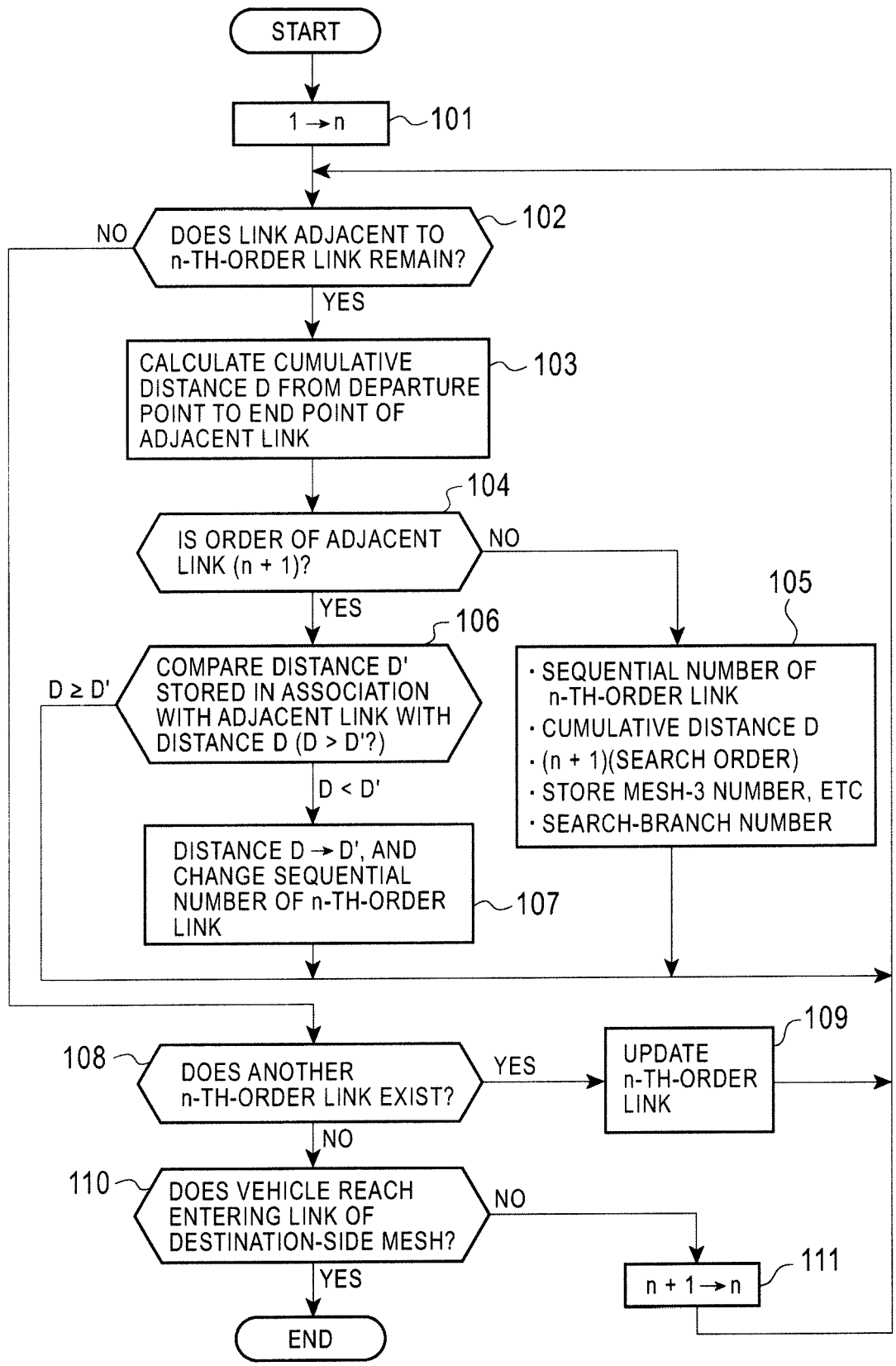
FIG. 11 is a flowchart showing route-search-processing performed by using the Dijkstra method.

FIG. 11 is a flowchart showing route-search-processing procedures performed by using the Dijkstra method where the value of a distance is determined to be the cost.

The value of a search order n of a predetermined departure link is determined to be one (1→n, step 101) and it is checked whether or not a link connecting to the n-th-order link exists (step 102). The first link is a link connecting to the departure point Ps. If a link connecting to the n-th-order link Ln (referred to as an adjacent link) exists, a cumulative distance D extending from the departure point Ps to the terminal point of an adjacent link $L_{aj}$ via the n-th-order link Ln is calculated (step 103).

Information about a distance $d_n$ extending from the departure point to the terminal point of the n-th-order link is stored in a storage unit with reference to the n-th-order link, as will be described later. Further, since information about a distance $d_{aj}$ of the adjacent link $L_{aj}$ is stored in a link record, the cumulative distance D extending from the departure point Ps to the adjacent link $L_{aj}$ can be calculated according to the following expression:

$$d_n + d_{aj} \to D.$$

Next, it is checked whether or not the search order of the adjacent link $L_{aj}$ is (n+1) (step 104). If the search order is not (n+1), the following data items including:

(1) the sequential number of the n-th-order link to which attention is given,
(2) the cumulative distance D extending from the departure point to the terminal point of the adjacent link $L_{aj}$,
(3) (n+1) indicating the search order of the adjacent link $L_{aj}$,
(4) the mesh-3 number,
(5) the link number of link $L_{aj}$, and
(6) the number of links extended until the link $L_{aj}$ is obtained through the search (the search-branch number) is stored in a storage unit in association with the adjacent link $L_{aj}$ (step 105). After that, the processing returns to step 102, so as to check whether or not a link connected to the n-th-order link to which attention is given still remains, and the remainder of the processing procedures is performed again. Here, the search-branch number is not necessarily required to make the route search. However, the search-branch number is required to perform the level-raising processing according to an embodiment of the present invention.

On the other hand, when the order of the adjacent link is (n+1), at step 104, that is to say, when the adjacent link is seen, as a link adjacent to another n-th-order link (when the above-described data items (1) to (6) are already stored, at step 105), a distance D' from the departure point, the distance D' being stored in association with the adjacent link, is compared to the distance D calculated, at step 103 (step 106). When the expression D<D' holds, the sequential number of the n-th-order link, the sequential number being stored in the storage unit in association with the adjacent link $L_{aj}$, is replaced by the sequential number of the n-th-order link to which attention is currently given, and the cumulative distance D' is rewritten, as the cumulative distance D (D→D', step 107). After that, the processing returns to step 102, so as to check whether or not the link connected to the n-th-order link to which attention is currently given still remains, and the remainder of the processing procedures is performed again. Further, when the expression D≧D' holds, the processing returns to step 102 without changing the data stored in the storage unit in association with the adjacent link.

When there is no link connected to the n-th-order link to which attention is currently given, at step 102, it is checked whether or not another n-th-order link exists (step 108). If the above-described n-th-order link exists, the n-th-order link is determined to be the n-th-order link again (step 109), and the processing from step 102 on down is performed again. If another n-th-order link does not exist, at step 108, it is checked whether or not the vehicle reaches a destination link (step 110). If the vehicle does not reach the destination link, the search order is incremented by one (n+1→n, step 111), and the processing from step 102 on down is performed again. However, if the vehicle reaches the destination link, the search processing is finished. In the above-described embodiment, the distance is determined to be the cost. However, when the cost also includes an element other than the distance, a cost C can be used in place of the distance.

Accordingly, after the search processing is finished, connection to (1) the destination link (the m-th-order link)→(2) the (M−1)-st-order link stored in association with the destination link→(3) the (M−2)-nd-order link stored in association with the (M−1)-st-order link→ . . . →(4) the first-order link stored in association with the second-order link is performed in sequence. Therefore, it becomes possible to obtain a route with the minimum cost (distance), the route extending from the departure link, which is the first-order link, to the destination link.

When the route-search-processing unit 12b shown in FIG. 6 performs the route-search processing, the route search is made according to the above-described Dijkstra method until the time where the search branch can be extended only with difficulty. Therefore, it is determined whether or not the search branch can be extended, as a substitute for the processing performed, at step 110 shown in FIG. 11. If the search branch can be extended, the search order is increment by one (n+1→n, step 111), and the processing from step 102 on down is performed again. However, if it is difficult to extend the search branch and make the route search, each of all of the leaving links of all of the rectangles (all of the entering links) is traced in the backward direction to the search-start link, so as to obtain the route starting from the search-start-link set to the leaving link.

(c) Link-acquisition Unit

The link-acquisition unit 14 acquires at least one link for each of routes obtained through the search, the link generating the route, as a level-3 link. The number of the at least one link is equivalent to or smaller than a predetermined link number N. The link number N corresponds to the links that can be traced back to the start link of the route. Further, the number of search branches used for the level-3 link, the search branches being required to make the route search, is equivalent to or larger than a set-branch number LB. Then, the link closest to the search-start link is selected from the at least one acquired link, and specified, as a route-search-start link of level 3. Here, the predetermined link number N corresponds to two-fifths of the number of links generating the route and the set-branch number LB is 1000.

Figure 12:
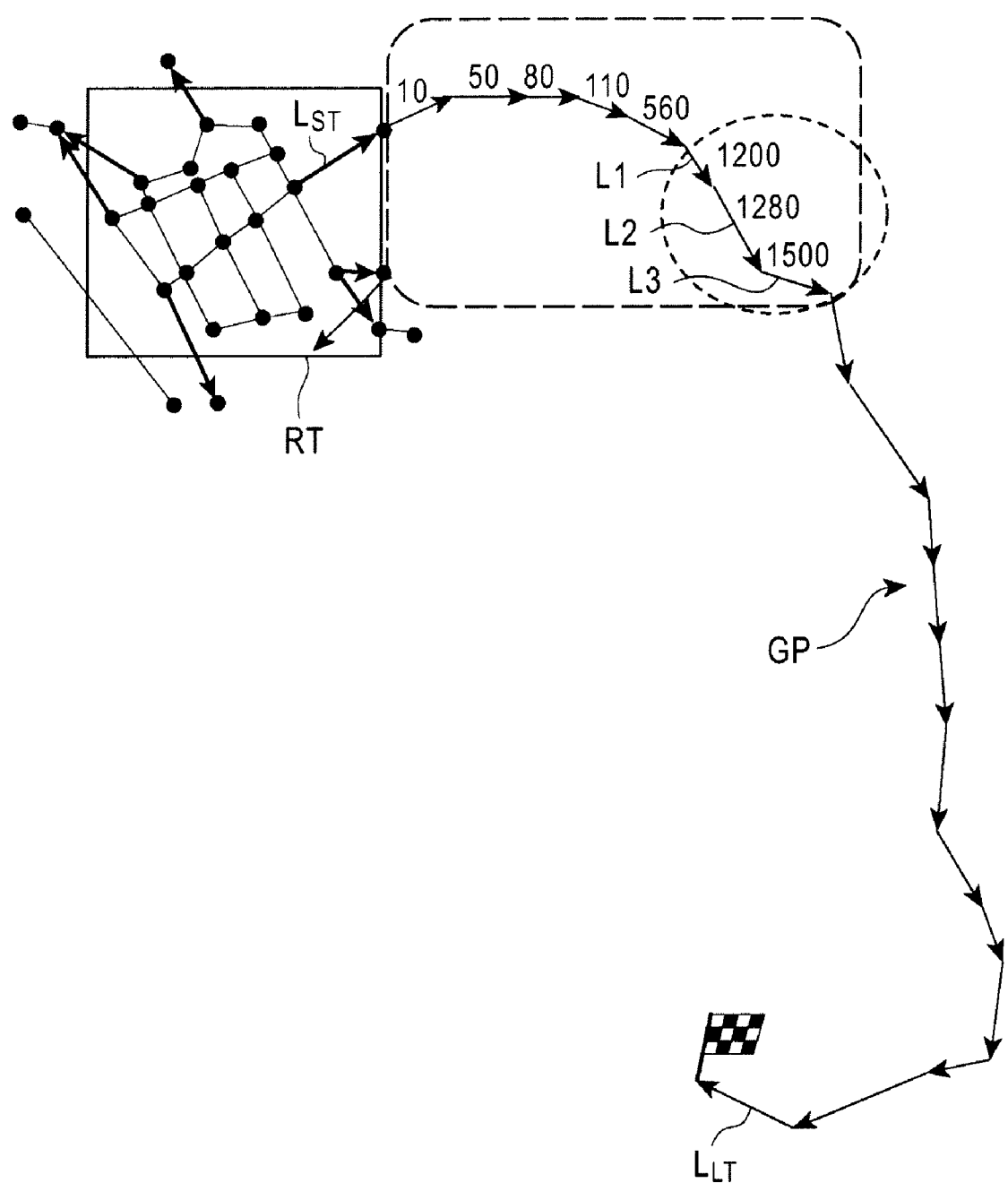
FIG. 12 illustrates route-acquisition processing.

FIG. 12 illustrates route-acquisition processing. When a route GP extending from a forward-direction-search-start-link set of a rectangle RT (indicated by a thick link provided in the rectangle) to a predetermined leaving link $L_{LT}$ is obtained, the link-acquisition unit 14 acquires links L1, L2, and L3 generating the route GP, as the level-3 link. The number of the acquired links is equivalent to or smaller than a predetermined link number 8 (=20×⅖). The link number 8 corresponds to the links that can be traced back to a route-start link $L_{st}$. Further, the number of search branches used for the acquired links, the search branches being required to make the route search, is equivalent to or larger than a set-branch number, that is, one thousand. Then, a link L1 closest to the search-start link Lst of all the acquired links is specified, as the route-search-start link of level 3. Here, the number added to each of route-generating links shown in FIG. 12 is the search-branch number. Routes extending from the set of forward-direction-search-start links of the rectangle RT to all of leaving links $L_{LT}$ are obtained, and level-3-link information and a route-search-start link of level 3 are obtained. Here, the set of all of the level-3-search-start links obtained in relation to the set of forward-direction-search-start links of a single rectangle is equivalent to the set of forward-direction-route-search-start links of level 3.

Level-3-link information and the set of forward-direction-search-start links of level 3 are obtained for a set of forward-direction-search-start links of each of the rectangles RT and produced in the above-described manner. Further, the same processing is performed for a set of backward-direction-search-start links of each of the rectangles. Accordingly, the link-acquisition unit 14 can send the level-3-link information and information about the set of level-3-forward-direction-route-search-start links and the set of level-3-backward-direction-route-search-start links that are obtained for each of the rectangles to the second-upper-level-link-determination unit 3.

A next-level-search-start-link-identification-and-addition unit 13 adds information indicating whether or not a predetermined link is a level-3-route-search-start link to level-2 link information (see FIG. 2A) and transmits the level-2 link information to the route-search-map-data-editing unit 5.

(d) Level-raising Processing 1

Figure 13:
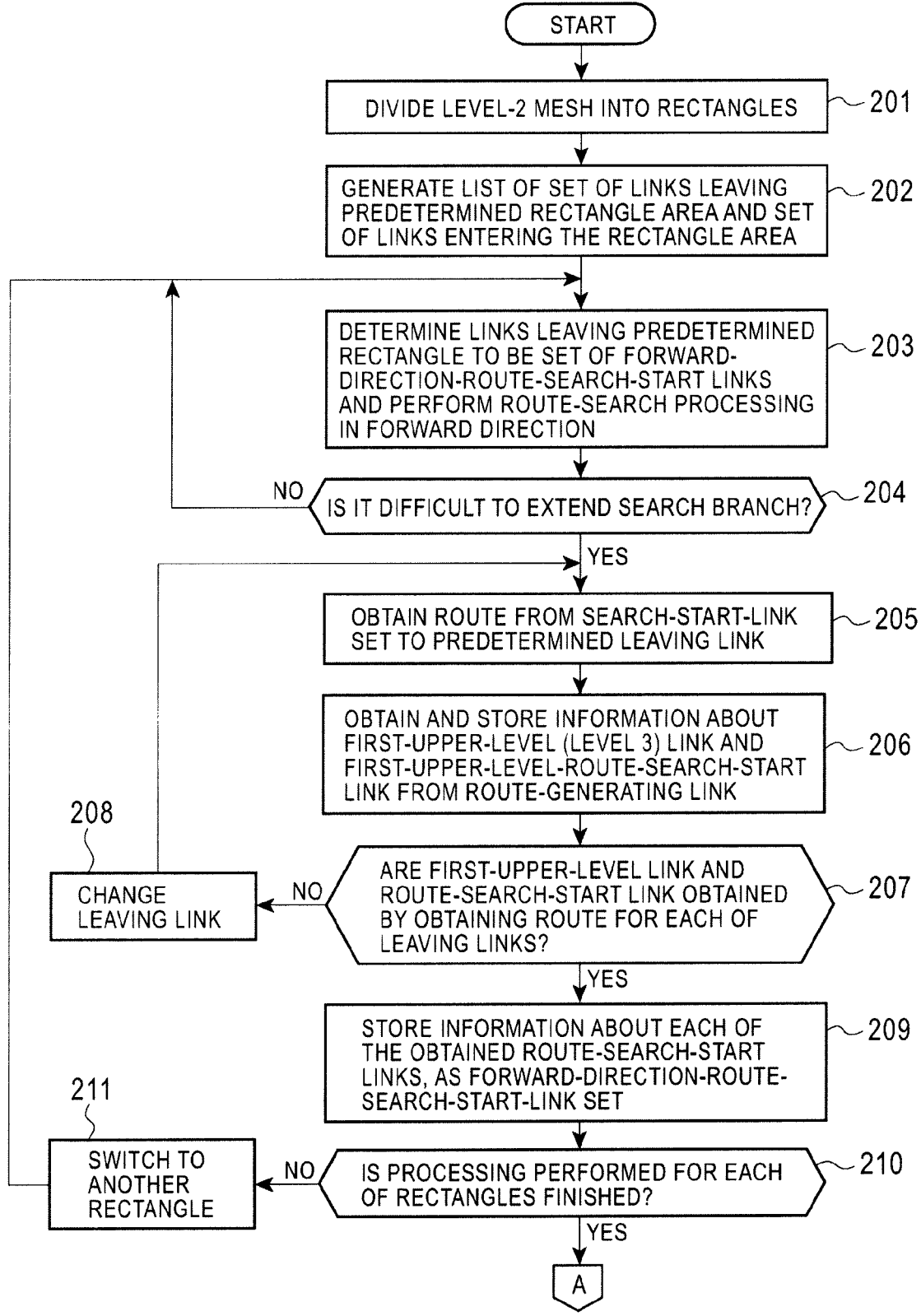
FIG. 13 is a first flowchart illustrating level-raise processing 1 performed by a first-upper-level-link-determination unit.
Figure 14:
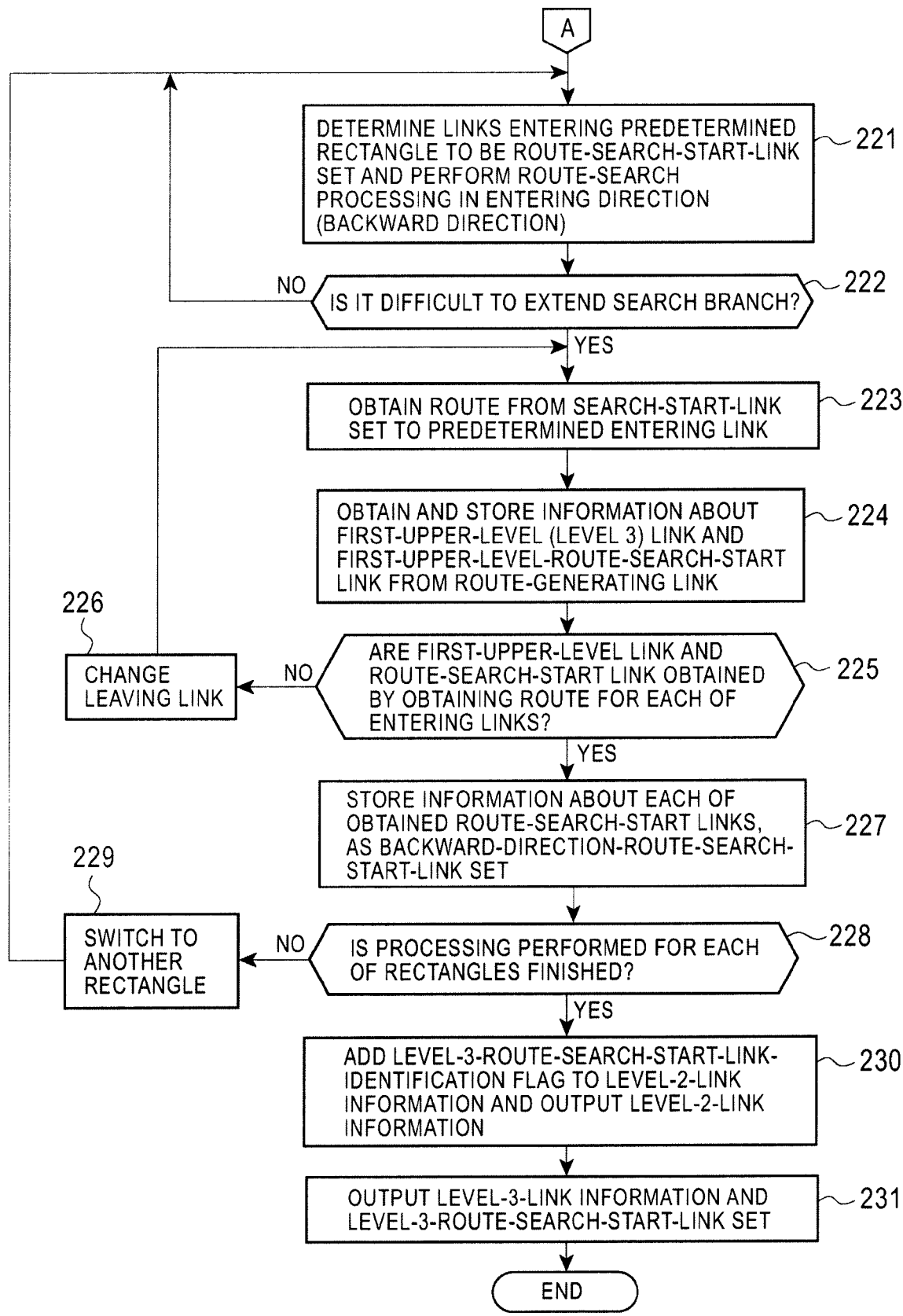
FIG. 14 is a second flowchart illustrating the level-raise processing 1 performed by the first-upper-level-link-determination unit.

Each of FIGS. 13 and 14 is a flowchart illustrating the level-raising processing 1 performed by the first-upper-level-link-determination unit 2.

When the level-2-link information is transmitted, the first-upper-level-link-determination unit 2 divides the level-2 mesh into basic rectangles so that the number of links belonging to the basic rectangles is equivalent to or smaller than LA (step 201). Then, the upper-level-link-determination unit 2 determines a link set which is a set of links leaving the rectangle and a link set which is a set of links entering the rectangle to be a forward-direction-search-start link and a backward-direction-search-start link for each of the rectangles. After that, the upper-level-link-determination unit 2 generates the list of the above-described link sets (step 202).

After generating the above-described list, the first-upper-level-link-determination unit 2 selects the forward-direction-search-start-link set of a predetermined rectangle and performs the route-search processing in a forward direction from the search-start-link set according to the Dijkstra method until the time where the search branch can be extended only with difficulty (steps 203 and 204). If it becomes difficult to extend the search branch, the first-upper-level-link-determination unit 2 selects the predetermined leaving link $L_{LT}$, as a destination link by using information about a result of the search processing, and obtains the route GP extending to the destination link (step 205).

Next, the first-upper-level-link-determination unit 2 acquires predetermined links, as the level-3 links, where the number of the acquired links is equivalent to a predetermined link number (two-fifths of the number of route-generating links), where the predetermined link number is the number of links that can be traced back to the route-start link of the obtained route GP. Further, the number of search branches used for the acquired links, so as to make the route search, is equivalent to or larger than the set-branch number, that is, one thousand. The first-upper-level-link-determination unit 2 stores information about a link which is the closest to the route-search-start link Lst of all the acquired links, as information about the level-3-route-search-start link (step 206). After that, the first-upper-level-link-determination unit 2 checks whether or not the processing procedures corresponding to steps 205 and 206 are finished for each of the leaving links of all of the rectangles (step 207). If the processing procedures are not finished, another leaving link is selected, as the destination link (step 208) and the processing from step 205 on down is performed again.

Figure 15:
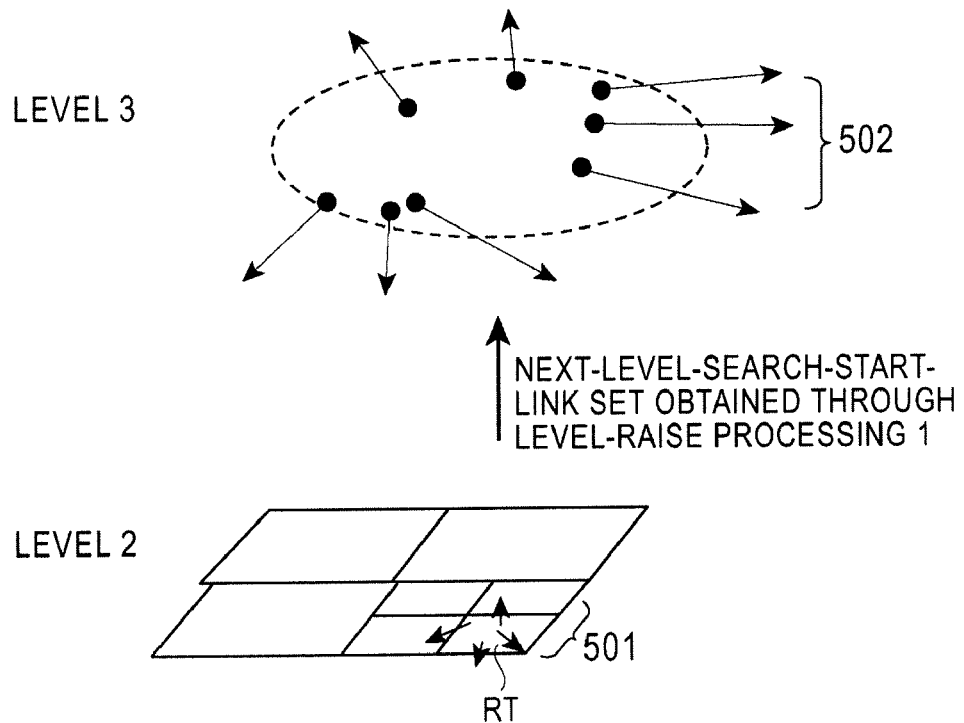
FIG. 15 illustrates a forward-direction-route-search-start-link set.

After the processing procedures corresponding to steps 205 and 206 are performed for each of the entire leaving links, at step 207, information about each of the route-search-start links obtained for the set of forward-direction-search-start links of a single rectangle is stored, as information about the level-3-forward-direction-route-search-start-link set (step 209). FIG. 15 illustrates the level-3-forward-direction-route-search-start-link set. More specifically, FIG. 15 illustrates a forward-direction-search-start-link set 502 of level 3, where the link set 502 is obtained from a forward-direction-search-start-link set 501 of the basic rectangle RT of level 2 by performing the level-raising processing 1 associated with a higher level map.

Next, the first-upper-level-link-determination unit 2 checks whether or not the processing from step 203 on down is finished for each of the basic rectangles (step 210). If the above-described processing is not finished, the first-upper-level-link-determination unit 2 switches from the currently-used basic rectangle to another basic rectangle (step 211) and performs the processing from step 203 on down again.

On the other hand, if the processing from step 203 on down performed for the set of forward-direction-search-start links of each of the basic rectangles is finished, the first-upper-level-link-determination unit 2 performs the same processing as that from step 203 on down for the set of backward-direction-search-start links. That is to say, the first-upper-level-link-determination unit 2 selects a set of backward-direction-search-start links of a predetermined rectangle and performs route-search processing in a backward direction from the backward-direction-search-start-link set according to the Dijkstra method until the time where a search branch can be extended only with difficulty (steps 221 and 222). If it becomes difficult to extend the search branch, such as more difficult as compared with the previous branches or requiring more processing time for the next branch, the first-upper-level-link-determination unit 2 selects a predetermined entering link $L_{LT}$, as a destination link by using information about a result of the search processing, and obtains the route GP extending to the destination link (step 223).

Next, the first-upper-level-link-determination unit 2 acquires predetermined links, as the level-3 links, where the number of the acquired links is equivalent to or smaller than a predetermined link number (two-fifths of the number of route-generating links), where the predetermined link number is the number of links that can be traced back to the route-start link of the obtained route GP. Further, the number of search branches used for the acquired links, so as to make the route search, is equivalent to or larger than the set-branch number, that is, one thousand. The first-upper-level-link-determination unit 2 stores information about a link which is the closest to the route-search-start link Lst of all the acquired links, as information about the level-3-route-search-start link (step 224). After that, the first-upper-level-link-determination unit 2 checks whether or not the processing procedures corresponding to steps 223 and 224 are finished for each of the entering links of each of the rectangles (step 225). If the processing procedures are not finished, another entering link is selected, as the destination link (step 226), and the processing from step 205 on down is performed again.

Figure 16:
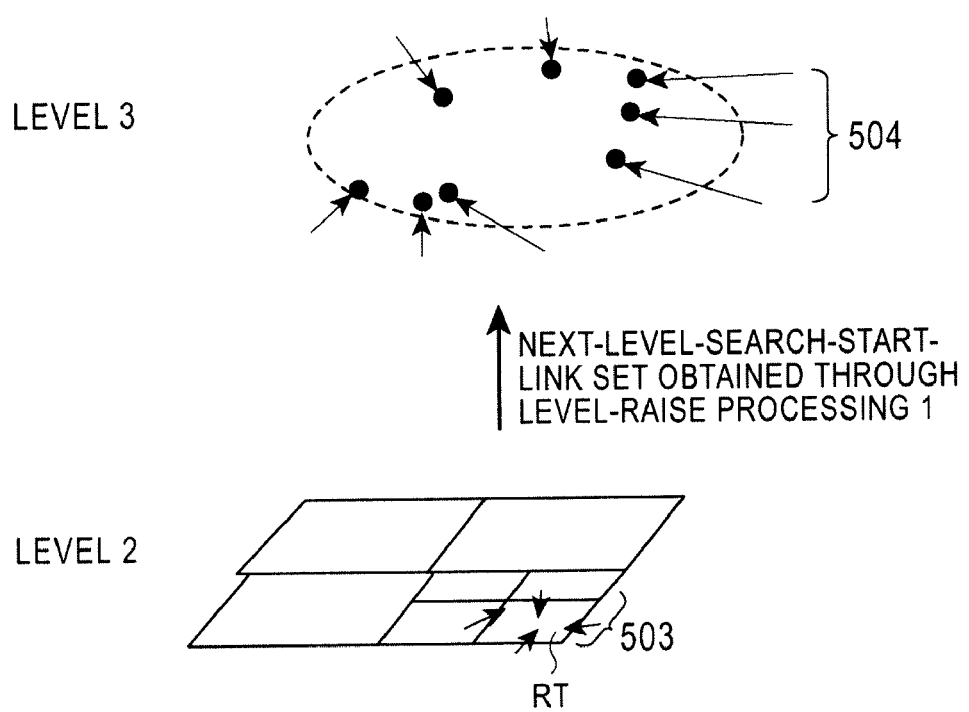
FIG. 16 illustrates a backward-direction-route-search-start-link set.

After the processing procedures corresponding to steps 223 and 224 are performed for each of the entering links, at step 225, the first-upper-level-link-determination unit 2 stores information about each of the route-search-start links obtained for the set of backward-direction-search-start links of a single rectangle, as information about the level-3-backward-direction-route-search-start-link set (step 227). FIG. 16 illustrates the level-3-backward-direction-route-search-start-link set. More specifically, FIG. 16 shows a backward-direction-search-start-link set 504 of level 3, where the link set 504 is obtained from a backward-direction-search-start-link set 503 of the basic rectangle RT of level 2 by performing the level-raising processing 1 associated with a higher level map.

Next, the first-upper-level-link-determination unit 2 checks whether or not the processing from step 221 on down is finished for each of the basic rectangles (step 228). If the above-described processing is not finished, the first-upper-level-link-determination unit 2 switches from the currently-used basic rectangle to another basic rectangle (step 229) and performs the processing from step 221 on down again.

After the processing from step 221 on down performed for the backward-direction-search-start-link set of each of the basic rectangles is finished, the first-upper-level-link-determination unit 2 adds information indicating whether or not a predetermined link is a level-3-route-search-start link to level-2 link information (see FIG. 2A) and transmits the level-2 link information to the route-search-map-data-editing unit 5 (step 230). Further, the first-upper-level-link-determination unit 2 transmits the level-3-link information, the set of forward-direction-route-search-start links of level 3, and the set of backward-direction-route-search-start links of level 3 (see FIGS. 15 and 16) to the second-upper-level-link-determination unit 3 (step 231).

Figure 17:
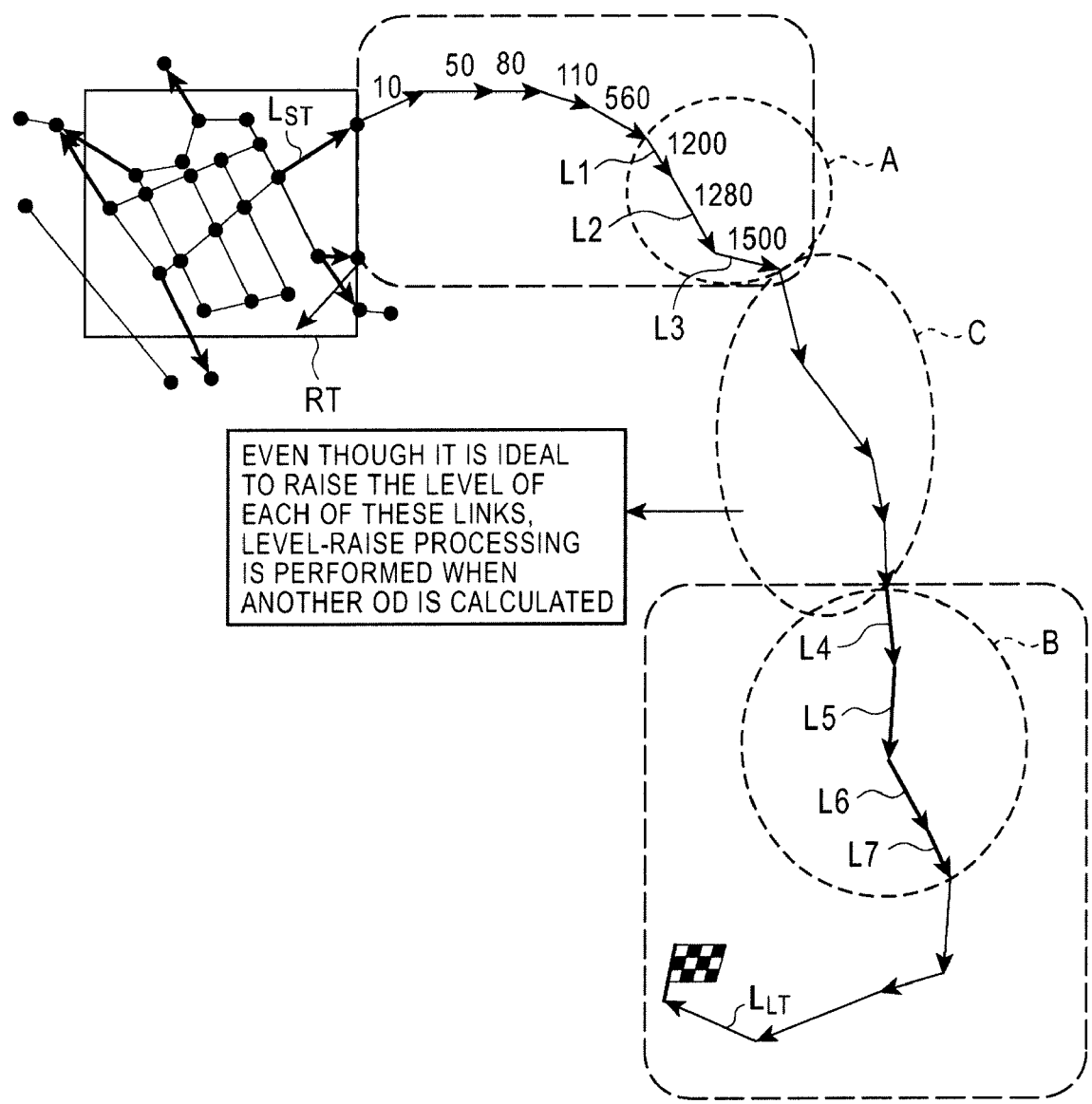
FIG. 17 illustrates a level-raised link achieved through the level-raise processing 1.

According to the level-raising processing 1, links L1, L2, and L3 shown in circle A shown in FIG. 17 are subjected to the forward-direction-search processing and made into level-raised links, and links L4, L5, L6, and L7 shown in circle B are subjected to the backward-direction-search processing and made into level-raised links. The level-raising processing may not be performed for links shown in an area C, even though it is ideal to raise the level of each of the links shown in the area C, because the links shown in the area C will be subjected to the level-raising processing performed for another route.

(e) The Second-upper-level-link-determination Unit

Figure 18:
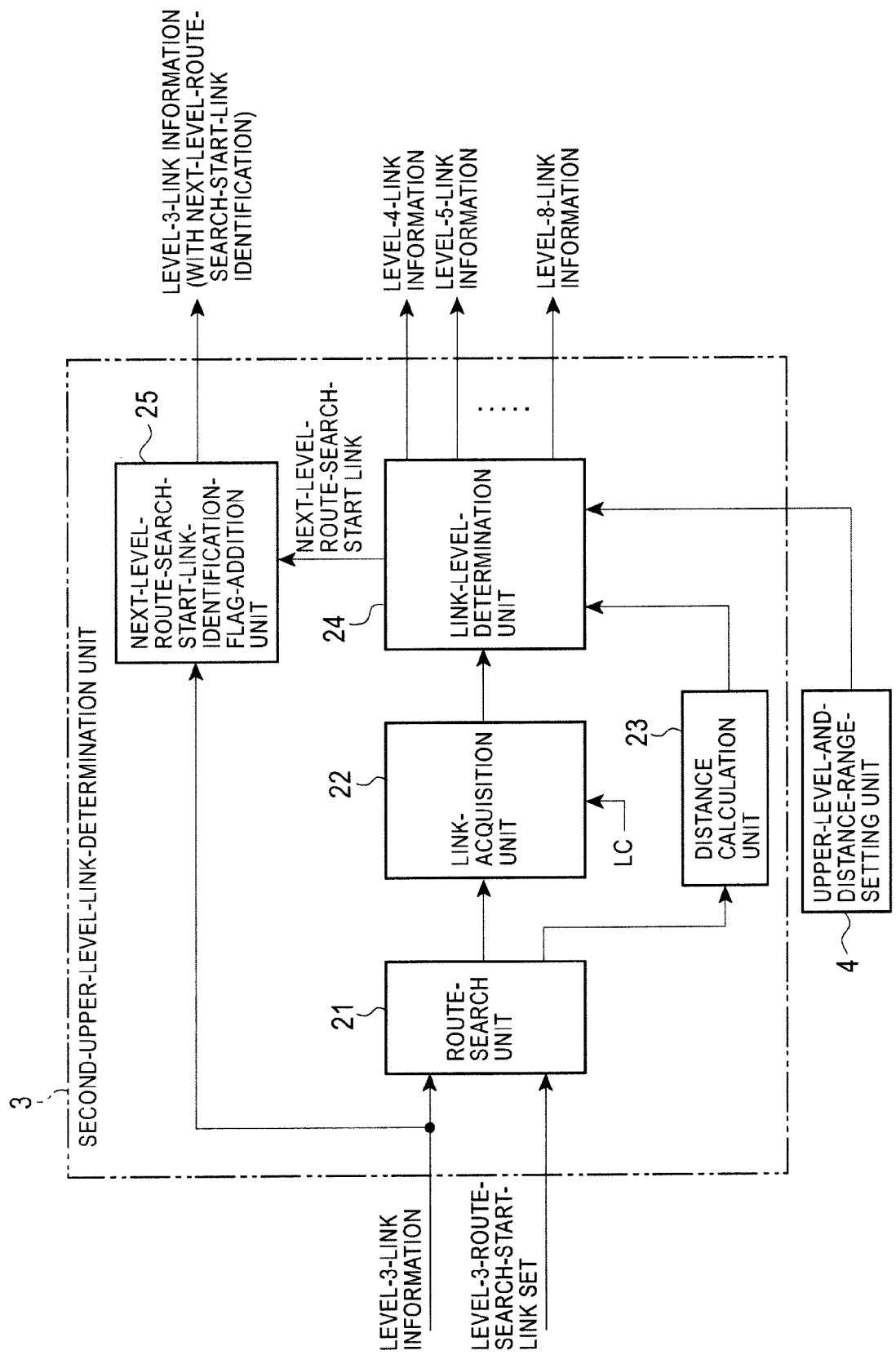
FIG. 18 is a block diagram of a second-upper-level-link-determination unit.

FIG. 18 is a block diagram of the second-upper-level-link-determination unit 3 including a route-search unit 21 configured to make a search for routes extending from the set of level-3-forward-direction-route-search-start links and the set of level-3-backward-direction-route-search-start links (see FIGS. 15 and 16) to a predetermined link, a link-acquisition unit 22 configured to extract the next-level link, a distance-calculation unit 23 configured to calculate a slant distance between a route-start-point link and a route-terminal-point link, a link-level-determination unit 24 configured to determine the level to which the extracted link belongs, and an identification-flag-addition unit 25 configured to identify a next-level-route-search-start link.

The route-search unit 21 performs route-search processing in a forward direction by using the level-3-link information until the time where a search branch can be extended only with difficulty from the level-3-forward-direction-route-search-start-link set. Next, the route-search unit 21 obtains routes extending from the route-search-start-link set to each of the route-search-start links of level 3 by using information about a result of the route-search processing and generates information about the routes. After that, the route-search unit 21 switches from the currently-used route-search-start-link set to another route-search-start-link set, performs the above-described route-search processing for the set of forward-direction-search-start links, and performs the route-search processing for each of the forward-direction-route-search-start-link sets in the above-described manner. After the route-search processing is performed for each of the forward-direction-route-search-start-link sets, the route-search processing is performed for each of the backward-direction-route-search-start-link sets in the above-described manner.

The link-acquisition unit 22 acquires at least one link for each of routes obtained through the search, the link generating the route, as a link of the next level. The number of the at least one link is equivalent to or smaller than a predetermined link number M. The link number N corresponds to the links that can be traced back to the link where the route is started. Further, the number of search branches used for the next-level link, the search branches being required to make the search, is equivalent to or larger than the set-branch number LC. Then, the link closest to the search-start link of all the acquired links is specified, as a route-search-start link of the next level. Here, the predetermined link number M corresponds to two-fifths of the number of links generating the route and the set-branch number LC is 2500.

Figure 19:
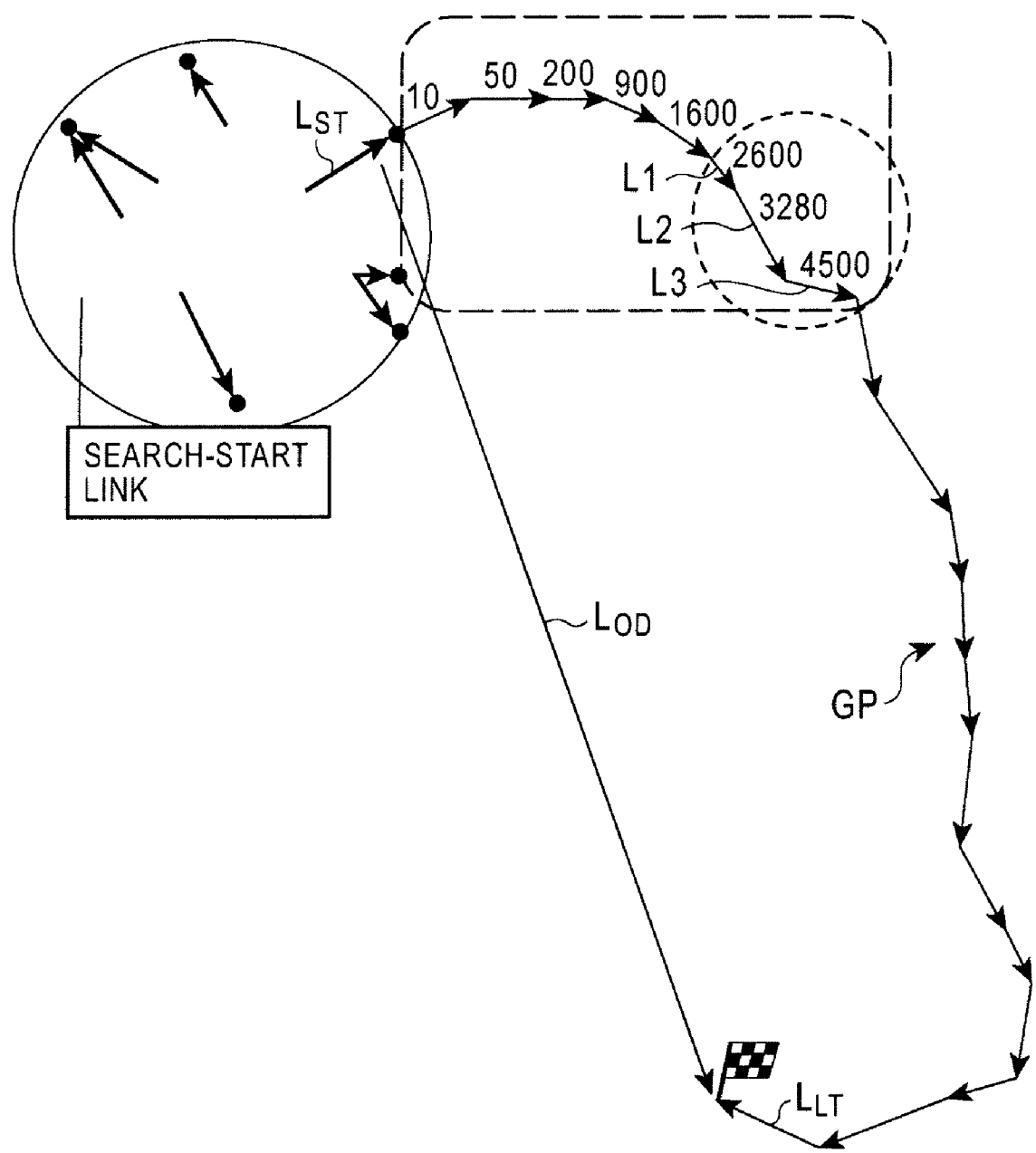
FIG. 19 illustrates route-acquisition processing achieved through level-raise processing 2.

FIG. 19 illustrates route-acquisition processing. When the route GP extending from a forward-direction-search-start-link set (indicated by thick links provided in a circle) to a predetermined route-search link $L_{LT}$ is obtained, the link-acquisition unit 22 acquires links L1, L2, and L3 generating the route GP, as the next-level links. The number of the acquired links is equivalent to or smaller than a predetermined link number $M=8(=20\times 2/5)$. The link number 8 corresponds to the number of links that can be traced back to a route-search-start link $L_{st}$. Further, the number of search branches used for the acquired links, the search branches being required to perform the search, is equivalent to or larger than a set-branch number, that is, twenty-five hundred. The link L1 closest to the route-search-start link Lst of all the acquired links is specified, as the route-search-start link of the next level. Here, the number added to each of route-generating links shown in FIG. 19 is the search-branch number.

The link-level-determination unit 24 determines the next level to which the link acquired by the link-acquisition unit 22 belongs. More specifically, the link-level-determination unit 24 determines the next level (including levels 4 to 8) according to which distance range includes a slant distance $L_{OD}$ between the route-start-point link $L_{ST}$ and the route-terminal-point link $L_T$, the slant distance $L_{OD}$ being calculated by the distance-calculation unit 23, and generates information about links of the next level. Here, the slant distance $L_{OD}$ of level 4 falls within the range of from 0 km to 50 km, the slant distance $L_{OD}$ of level 5 falls within the range of from 50 km to 100 km, the slant distance $L_{OD}$ of level 6 falls within the range of from 100 km to 200 km, the slant distance $L_{OD}$ of level 7 falls within the range of from 200 km to 350 km, and the slant distance $L_{OD}$ of level 8 falls within the range of from 350 km and up.

The identification-flag-addition unit 25 configured to identify the next-level-route-search-start link adds identification data (a next-level-search-start flag) showing whether or not the level-3 link is a next-level-route-search-start link and data indicating which of levels 4 to 8 corresponds to the next level (see FIG. 2C) to the level-3-link information. Then, the identification-flag-addition unit 25 transmits the level-3-link information to the route-search-map-data-editing unit 5.

Figure 20:
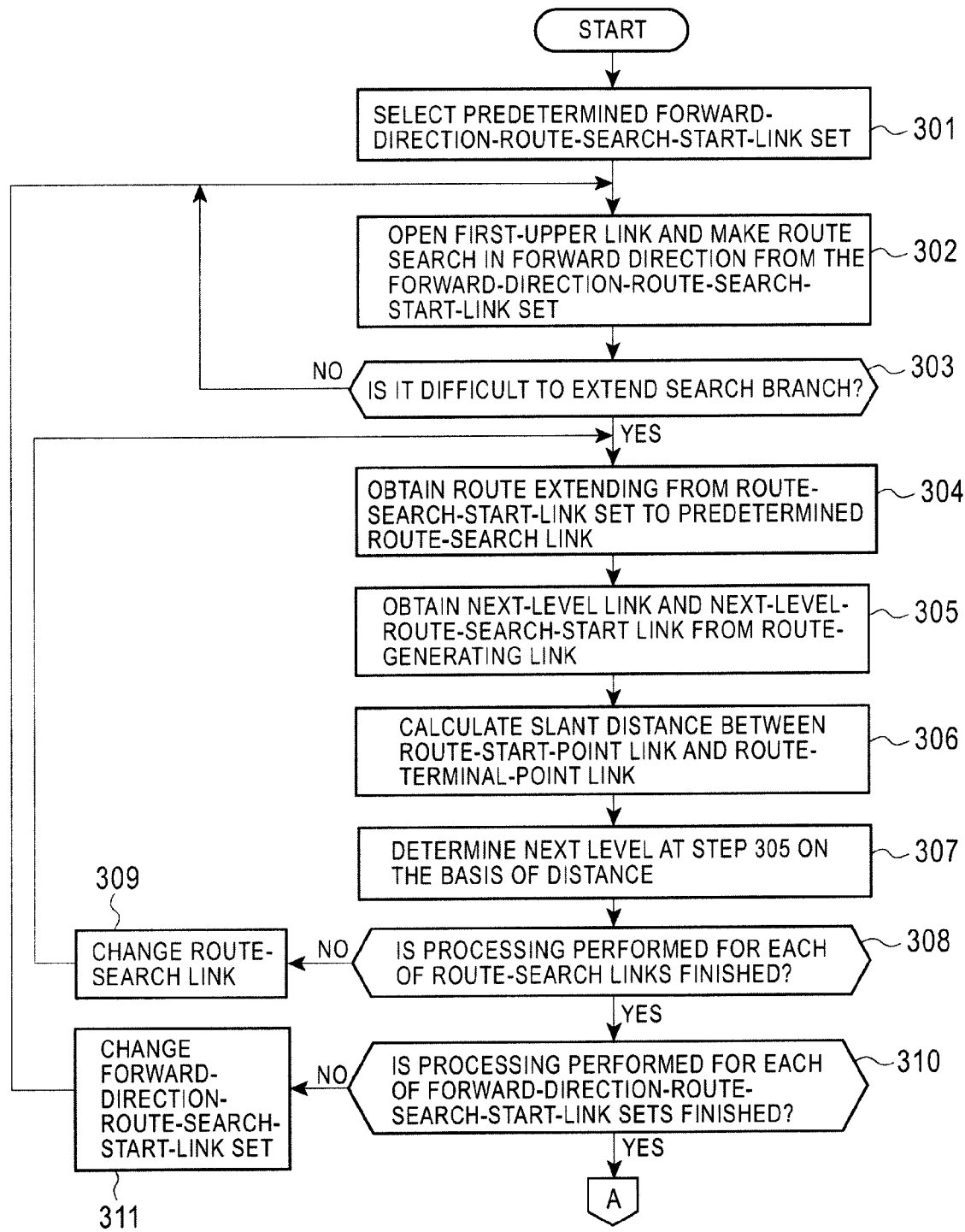
FIG. 20 is a first flowchart illustrating the level-raise processing 2.
Figure 21:
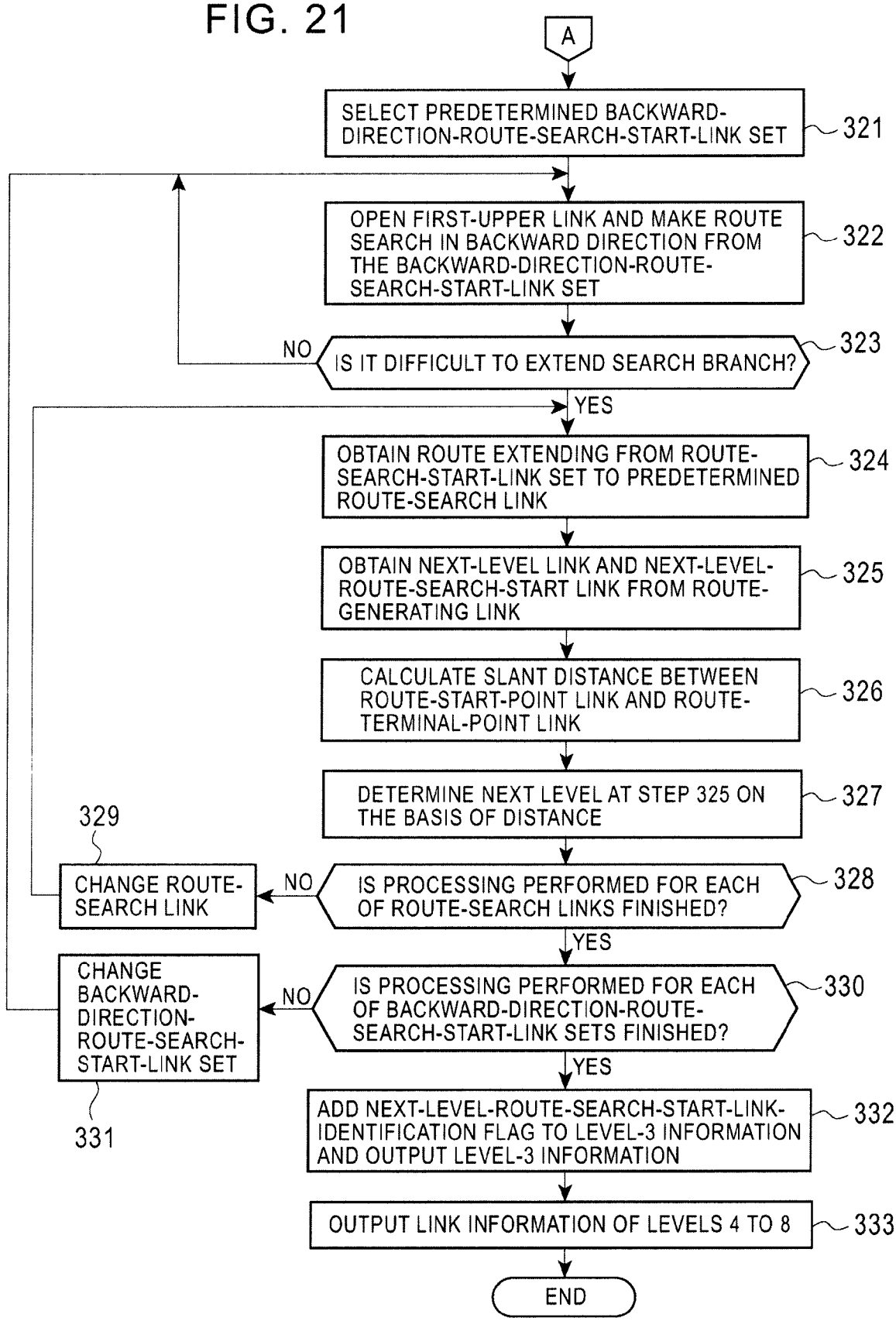
FIG. 21 is a second flowchart illustrating the level-raise processing 2.

Each of FIGS. 20 and 21 is a flowchart illustrating the level-raising processing 2 performed by the second-upper-level-link-determination unit 3.

Upon receiving the level-3-link information, the set of level-3-forward-direction-route-search-start links, and the set of level-3-backward-direction-route-search-start links, the second-upper-level-link-determination unit 3 selects the set of predetermined forward-direction-route-search-start links (step 301), and performs the route-search processing from the search-start-link set in a forward direction according to the Dijkstra method until the time where a search branch can be extended only with difficulty (step 302 and 303). If it becomes difficult to extend the search branch, the second-upper-level-link-determination unit 3 selects a predetermined level-3-search-start link $L_{LT}$, as a destination link, and obtains the route GP extending from the search-start-link set to the destination link by using information about a result of the search processing (step 304).

Next, the second-upper-level-link-determination unit 3 acquires predetermined links, as the next-level links, where the number of the acquired links is equivalent to or smaller than a predetermined link number M (two-fifths of the number of route-generating links), where the predetermined link number is the number of links that can be traced back to the route-start link of the obtained route GP. Further, the number of search branches used for the next-level links, so as to make the route search, is equivalent to or larger than the set-branch number, that is, twenty-five hundred. The second-upper-level-link-determination unit 3 stores information about a link which is the closest to the route-search-start link Lst of all the acquired links, as information about the next-level-route-search-start link (step 305). After that, the second-upper-level-link-determination unit 3 calculates the slant distance $L_{OD}$ between the route-start point link and the route-terminal-point link (step 306), and determines which of levels 4 to 8 corresponds to the next level calculated, at step 305, on the basis of the slant distance $L_{OD}$ (step 307).

Next, the second-upper-level-link-determination unit 3 checks whether or not the processing corresponding to steps 304 to 307 performed for each of the level-3-search-start links is finished (step 308). If the processing is not finished, the second-upper-level-link-determination unit 3 selects another level-3-search-start link, as a destination link (step 309), and performs the processing from step 304 on down again.

If the processing corresponding to steps 304 to 307 performed for each of the level-3-search-start links is finished, at step 308, the second-upper-level-link-determination unit 3 checks whether or not the processing from step 302 on down performed for each of the sets of the forward-direction-search-start links is finished (step 310). If the processing is not finished, the second-upper-level-link-determination unit 3 switches from the currently-used forward-direction-search-start-link set to another forward-direction-search-start-link set (step 311), and performs the processing from step 302 on down again.

On the other hand, if the above-described processing from step 302 on down performed for each of the sets of the forward-direction-search-start links is finished, the second-upper-level-link-determination unit 3 performs the same processing as that from step 301 on down for the set of backward-direction-search-start links. Namely, the second-upper-level-link-determination unit 3 selects a predetermined set of backward-direction-route-search-start links (step 321) and performs route-search processing from the search-start-link set in a backward direction according to the Dijkstra method until the time where a search branch can be extended only with difficulty (steps 322 and 323). If it becomes difficult to extend the search branch, the second-upper-level-link-determination unit 3 selects a predetermined search-start link $L_{LT}$ of level 3, as the destination link, and obtains the route GP extending from the search-start-link set to the destination link by using information about a result of the search processing (step 324).

Next, the second-upper-level-link-determination unit 3 acquires predetermined links, as the next-level links, where the number of the acquired links is equivalent to or smaller than the predetermined link number M (two-fifths of the number of route-generating links), where the predetermined link number is the number of links that can be traced back to the route-start link of the obtained route GP. Further, the number of search branches used for the next-level links, so as to make the route search, is equivalent to or larger than the set-branch number, that is, twenty-five hundred. The second-upper-level-link-determination unit 3 stores information about a link which is the closest to the route-search-start link Lst of all the acquired links, as information about the next-level-route-search-start link (step 325). After that, the second-upper-level-link-determination unit 3 calculates the slant distance $L_{OD}$ between the route-start-point link and the route-terminal-point link (step 326), and determines which of levels 4 to 8 corresponds to the next level calculated, at step 325, on the basis of the slant distance $L_{OD}$ (step 327).

Next, the second-upper-level-link-determination unit 3 checks whether or not the processing corresponding to steps 324 to 327 performed for each of the level-3-search-start links is finished (step 328). If the processing is not finished, the second-upper-level-link-determination unit 3 selects another level-3-search-start link, as the destination link (step 329), and performs the processing from step 324 on down again.

If the processing corresponding to steps 324 to 327 performed for each of the level-3-search-start links is finished, at step 328, the second-upper-level-link-determination unit 3 checks whether or not the processing from step 322 on down performed for each of the sets of the backward-direction-search-start links is finished (step 330) If the processing is not finished, the second-upper-level-link-determination unit 3 switches from the currently-used backward-direction-search-start-link set to another backward-direction-search-start-link set (step 331), and performs the processing from step 322 on down again.

On the other hand, when the above-described processing performed for all of the backward-direction-search-start-link set is finished, the second-upper-level-link-determination unit 3 adds information indicating whether or not the level-3 link is a next-level route-search-start link and which of levels 4 to 8 corresponds to the next level (see FIG. 2C) to the level-3-link information. Then, the second-upper-level-link-determination unit 3 transmits the level-3-link information to the route-search-map-data-editing unit 5 (step 332). Further, the second-upper-level-link-determination unit 3 transmits information about links of levels 4 to 8 to the route-search-map-data-editing unit 5 (step 333).

(B) Navigation Device

The Configuration

Figure 22:
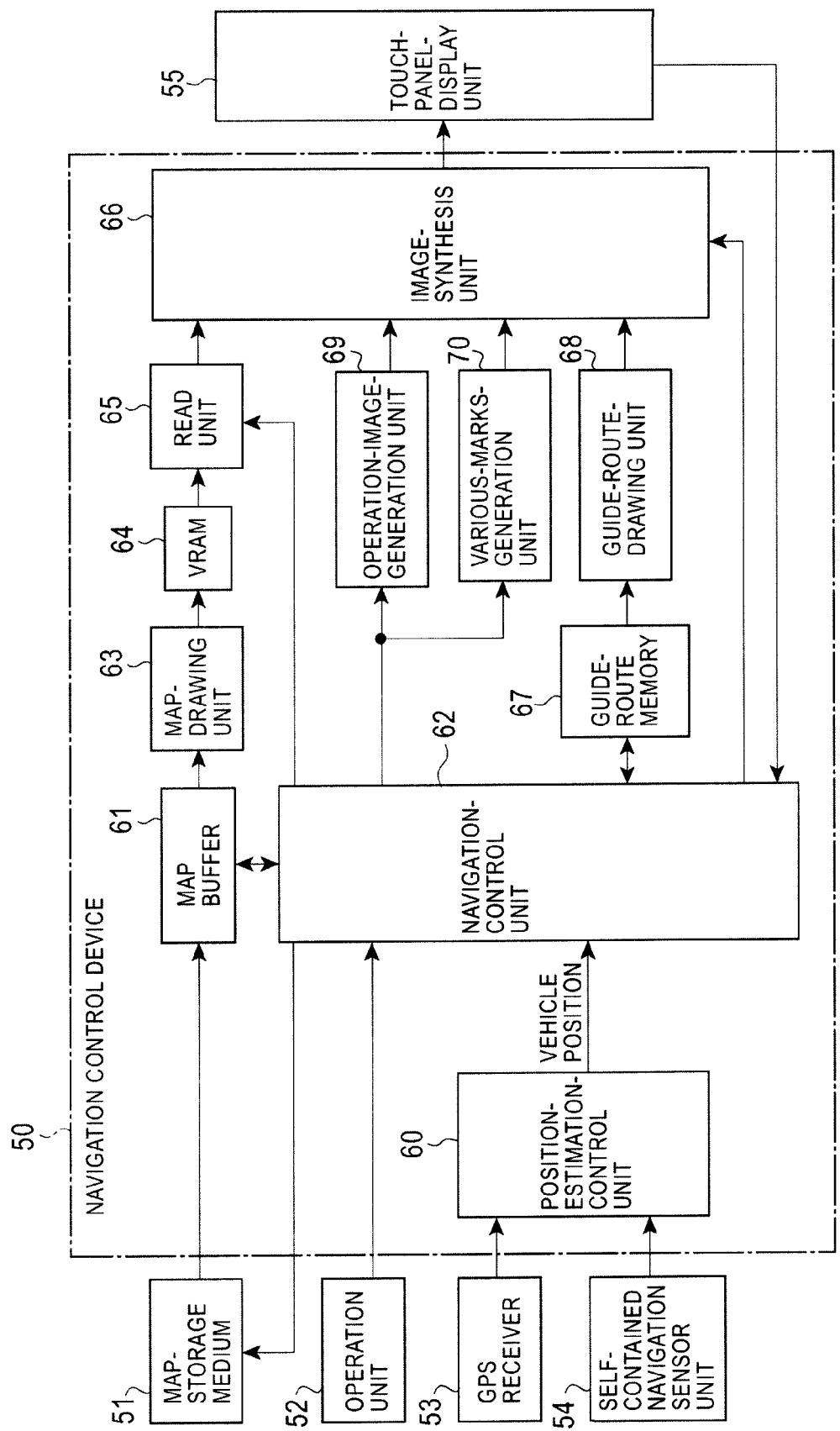
FIG. 22 shows the configuration of a navigation device according to an embodiment of the present invention.

FIG. 22 shows the configuration of a navigation device according to an embodiment of the present invention.

Map data generated by the map-generation device shown in FIG. 1 is stored by a map-storage medium (a compact-disk (CD) read-only memory (ROM), a digital versatile disk (DVD), and so forth) 51, so as to be read, as required. An operation unit 52 is configured to operate a navigation-control device 50 and includes a remote-control unit, and a hard key provided, so as to operate the navigation-control device 50. A global-positioning-system (GPS) receiver 53 receives a GPS signal transmitted from a GPS satellite and calculates the absolute-current position (GPS position) and/or travel direction of a vehicle. A self-contained-navigation-sensor unit 54 detects a change in the travel direction and the travel distance every predetermined time period, and transmits information about the detection result to the navigation-control device 50.

The touch-panel-display device 55 produces images of a vehicle-periphery map, a guide route, a menu, a vehicle-position mark, and so forth according to an instruction transmitted from the navigation-control device 50. Further, the touch-panel-display device 55 transmits a predetermined command to the navigation-control device 50 when a soft key shown on a screen image is pressed down.

In the navigation-control device 50, a position-estimation-control unit 60 estimates the vehicle position on the basis of a signal transmitted from each of the GPS receiver 53 and the self-contained-navigation-sensor unit 54, and transmits information about a result of the estimation to a navigation-control unit 62. A map buffer 61 stores the map data read from the map-storage medium 51. Although not shown, the navigation-control unit 62 includes a map-read-control unit configured to read and store data on a vehicle-position-periphery map in the map buffer 21 according to various information and/or commands transmitted to the navigation-control unit 62, a guide-route-control unit configured to perform guide-route-search control and route-guide control, an operation-screen-image-generation-control unit configured to generate and control various operation images and vehicle marks, and so forth.

A map-drawing unit 63 generates a map image by using the map data read and stored into the map buffer 61, and writes the generated map image into a video-random-access memory (VRAM) 64. An image-read unit 65 clips a predetermined image part away from the map image stored in the VRAM 64 according to an instruction transmitted from the control unit 22, and transmits data on the clipped image part to an image-synthesis unit 66.

A guide-route memory 67 stores information about a guide route extending to a destination, the guide route being obtained through a search made by the guide-route-control unit of the navigation-control unit 62, that is, data on each of the links generating the guide route extending from the departure point to the destination point. A guide-route-drawing unit 68 generates a guide-route image by using the guide-route information, transmits data on the generated guide-route image to the image-synthesis unit 66, and highlights the guide-route image on a drawn map. An operation-image-generation unit 69 generates various menu images (operation images) and transmits data on the generated menu images to the image-synthesis unit 66, and a mark-generation unit 70 generates various marks including a vehicle-position mark, a cursor, and so forth, and transmits data on the generated marks to the image-synthesis unit 66. The image-synthesis unit 66 overlays the various marks and the guide-route image on the map image read from the VRAM 64, and produces the map image over the entire screen.

Guide-route Search

Figure 23:
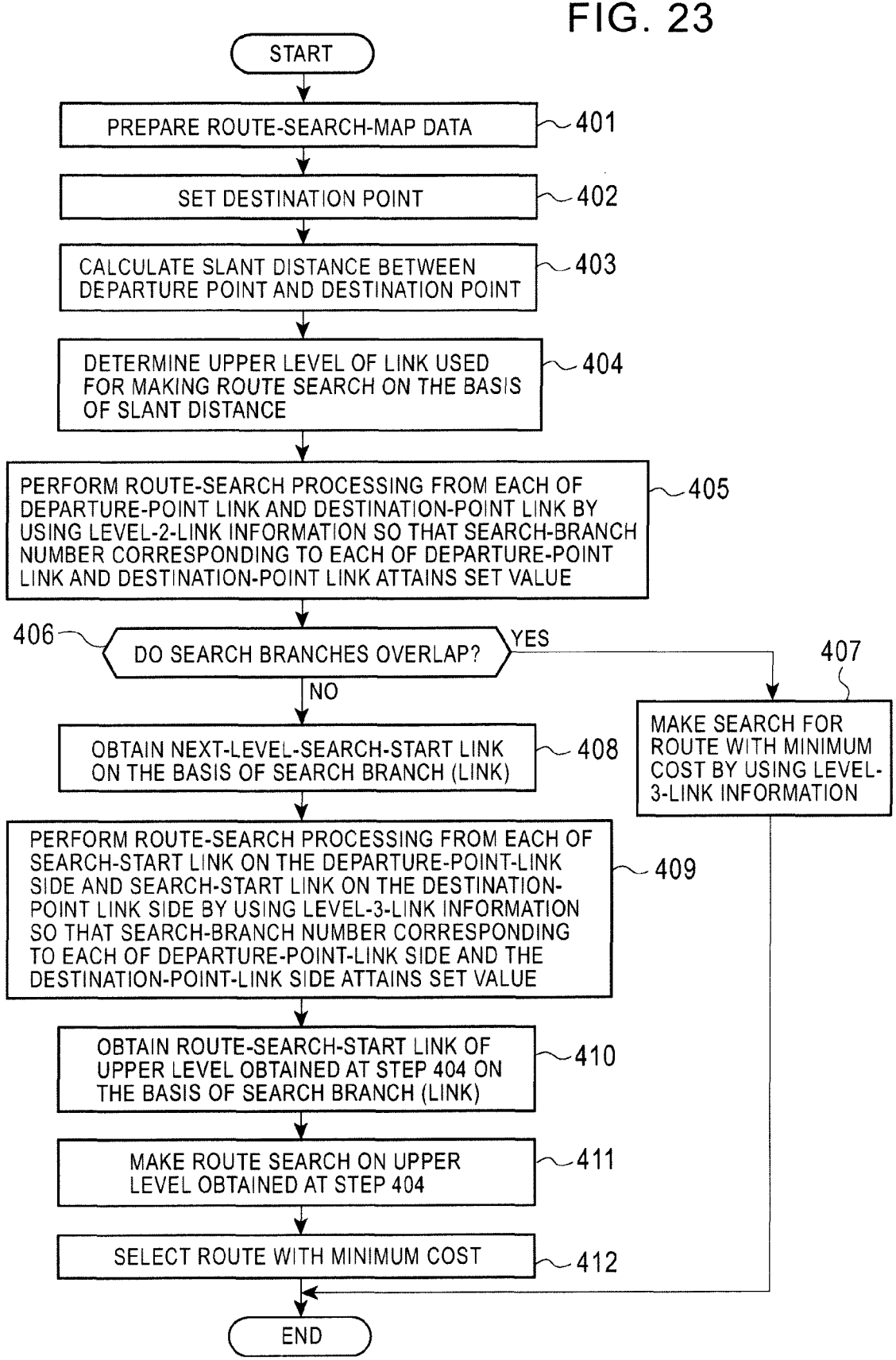
FIG. 23 is a flowchart showing guide-route-search processing performed according to an embodiment of the present invention, where a departure point and a destination point are specified.
Figures 25A, 25B:
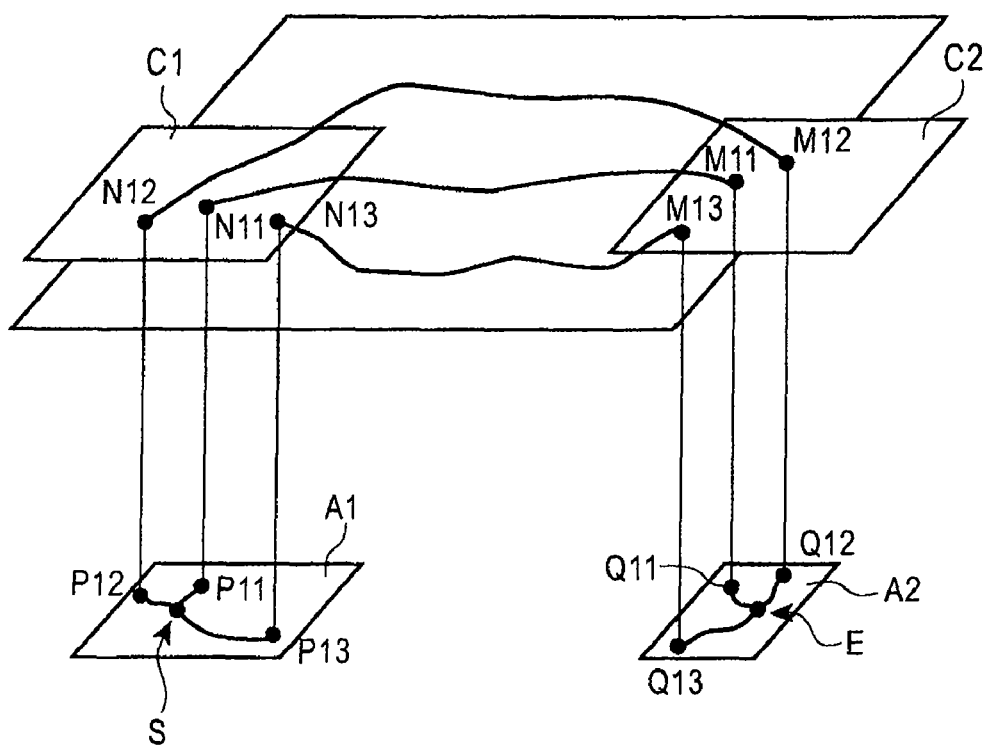
FIG. 25A illustrates the known technology 1.
FIG. 25B also illustrates the known technology 2.

FIG. 23 is a flowchart showing guide-route-search processing performed according to an embodiment of the present invention, where the departure point and the destination point are specified.

Hierarchical guide-route-search-map data is recorded onto a map-recording medium and the map-storage medium is inserted into the navigation device (step 401). Here, the hierarchical guide-route-search-map data includes information about road links of levels 1 and 2, level-3-link information obtained through the level-raising processing 1 performed by using the level-2-road-link information, and information about links of levels 4, 5, 6, 7, and 8, the link information being obtained through the level-raising processing 2 performed by using the level-3-link information. When the destination is set through the operation unit 52 and/or the touch panel after the above-described processing is performed (step 402), the navigation-control unit 62 calculates the slant distance $L_{OD}$ between the departure point and the destination point (step 403) and determines an upper level to which a link used for making the route search belongs on the basis of the slant distance $L_{OD}$ (step 404).

Next, the navigation-control unit 62 performs the route-search processing from both the departure point and the destination point by using the level-2-link information and extends search branches until the number of the search branches attains 1400 (=LA+LB+α) (step 405). The signs LA and LB are parameters used during the map generation, where the expressions LA=100 and LB=1000 hold. The sign α denotes a guaranteed value determined to be three hundred, so as to acquire a next-level-search-start point with stability.

When the search-branch number attains fourteen hundred, it is checked whether or not the search branches extended from each of the departure-point side and the destination-point side overlap one another (step 406). If the search branches overlap one another, that is to say, when the departure point and the destination point are close to each other, the route search is made by using the level-3-link information alone (step 407). If the search branches do not overlap one another, a route-search-start link of level 3 is extracted from fourteen hundred search branches (links) on each of the departure-point side and the destination-point side (step 408).

Next, a predetermined search-start link obtained through the search made on the departure-point side is determined to be a start point of level 3 and a predetermined search-start link obtained through the search made on the destination-point side is determined to be a terminal-point link of level 3. Then, the route-search processing is performed from both the level-3-start point and the level-3-terminal point, and search branches are extended until the number of the search branches attains 2500 (=LC+β) (step 409). The sign LC is a parameter used during the map generation, where the expression LC=2200 holds, for example. The sign β denotes a guaranteed value determined to be three hundred, so as to acquire the next-level-search-start point with stability.

If the search-branch number attains twenty-five hundred, a route-search-start link of an upper level (level 5) determined, at step 404, is extracted from twenty-five hundred search branches (links) on each of the departure-point side and the destination-point side (step 410).

After that, a predetermined search-start link obtained through a search made on the departure-point side is determined to be a start-point link of level 5 and a predetermined search-start link obtained through a search made on the destination-point side is determined to be a terminal-point link of level 5. Then, the route-search processing is performed from both the start-point link and the terminal-point link so that a route is obtained (step 411).

After that, another search-start link obtained through a search made on the departure-point side is determined to be a level-3-start-point link and another search-start link obtained through a search made on the destination-point side is determined to be a level-3-terminal-point link, and the processing from steps 409 to 411 on down is performed again so that routes are obtained. Then, a route with the minimum cost is selected and data on the route is generated (step 412).

(C) Comparisons Between Performance Capabilities

FIG. 24 illustrates comparisons between the performance capabilities of an embodiment of the present invention (the low-difference-high-speed-search system), the known technology 1 (the special-purpose-network-search system), and the known technology 2 (the normal-hierarchical-search system).

(1) Search Time

According to the configuration of the special-purpose-network system disclosed in the known technology 1, no search branch extends to an unnecessary link during connection search. Therefore, the search time required by the special-purpose-network system is shorter than that required by other systems.

According to the configuration of the normal-hierarchical-search system disclosed in the known technology 2, search branches need to be extended over a large area during upper-level-shift search (search achieved by shifting to an upper level). Therefore, the normal-hierarchical system requires much time to make the route search.

In a network used for the low-difference-high-speed-search system according to an embodiment of the present invention, the most suitable solution can be obtained during the upper-shift search by extending a predetermined number of search branches. Therefore, the search time required by the low-difference-high-speed-search system is shorter than that required by the normal-hierarchical-search system where the search branches are extended over the large area, so as to prepare for the worst.

(2) The Search-data Amount

The special-purpose-network-search system disclosed in the known technology 1 has a special-purpose network capable of shifting from one mesh to another mesh. Subsequently, the number of meshes is increased to about five thousand so that the search-data amount is increased to 1.95 gigabytes (GB). The above-described low-difference-high-speed-search system according to an embodiment of the present invention requires 0.53 GB of search data, which is one-fourth of the search data required by the special-purpose-network system disclosed in the known technology 1.

(3) The Difference Amount

When data obtained in the case where two routes are added is generated and a difference is calculated, the amount of difference data used by the above-described low-difference-high-speed-search system is one thousandth of that used by the above-described special-purpose-network system, so that a mobile phone or the like can receive the above-described data.

(4) The Quality of Static-route Search

In the normal-hierarchical-search system disclosed in the known technology 2, levels are determined on the basis of attribution information including information about the road type or the like. Therefore, the quality of a route obtained through a search made by the normal-hierarchical-search system is lower than that of a route obtained through a search made on the lower-most level (a level where information about all of the guide-object routes is stored).

(5) The Quality of Dynamic-route Search

According to the special-purpose-network-search system disclosed in the known technology 1, links are provided in a network near the own-vehicle position and/or the destination point at a predetermined density. However, links used only for the static-route search are stored in a range fifteen kilometers away from the vehicle position and the destination point, a detour can be made only with difficulty in most cases. Since an ordinary vehicle-information-and-communication system (VICS) only receives information about the periphery of the own-vehicle position, problems hardly occur due to the above-described difficulty in making the detour. However, if an inter-navigation VICS or the like is used, so as to acquire traffic-congestion information or the like obtained from a range larger than that used by the ordinary VICS, it becomes difficult to obtain the most appropriate route.

In the normal-hierarchical-search system disclosed in the known technology 2, a predetermined network density can be attained in every range. However, since a sufficient number of links required to make the static-route search are not stored, the route quality is low.

In the low-difference-high-speed-search system according to an embodiment of the present invention, a predetermined-level network density can be attained in every range. Therefore, there are links that can be detoured near a point midway between the own-vehicle position and the destination point.

Thus, the present invention allows for making a route search with high speed and increasing the route quality. Further, when updating map data by generating data on the difference between a new map and an old map, the present invention allows for decreasing the difference data in size and time required to update the map.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A map-data-generation method capable of generating hierarchical map data by using road link information associated with a reference level map, the method comprising:
   determining, with a first link-determination unit, at least one first upper level link of a first upper level map by using the road link information associated with the reference level map, the first upper level map being at a higher map level than the reference level map, and specifying at least one link to function as a route-search-start link of the first upper level map; and
   determining, with a second-link determination unit, upper level links of a plurality of upper level maps higher than the first upper level map by using information associated with the first upper level link, and specifying at least one upper level link to function as a route-search-start link for each of the plurality of upper level maps,
   wherein the plurality of upper level maps are defined according to a distance range between a departure point and a destination point.

2. The map-data-generation method according to claim 1, wherein determining at least one first upper level link includes:
   dividing, with a list-generation unit, at least one mesh of the reference level map into divided areas, ensuring that the number of links within the divided areas is approximately equivalent to or lower than a predetermined number, and generating a list of leaving links, each of the leaving links exiting a divided area;
   generating, with a route-search unit, a search-start link set from all of the links leaving at least one predetermined divided area, and performing route-search processing in a forward traveling direction to search for routes extending from the search-start link set; and
   acquiring, with a link-acquisition unit, route links associated with routes obtained through the search, where the number of the acquired route links is approximately equivalent to or smaller than a predetermined link number, the predetermined link number denoting the number of links from a route-start link to a predetermined link, and where the number of search branches required to complete the route search is approximately equivalent to or larger than a predetermined branch number, and specifying an adjacent link which is the closest to the route-start link of all of the acquired route links as a route-search-start link of the first upper level map.

3. The map-data-generation method according to claim 2, wherein the route-search processing is performed by the route-search unit until the search branch can be extended only with more difficulty than a previous search branch extension, and after the difficulty in extending the search branch increases, a search for routes extending from the search-start link set is performed on the basis of a result of the route-search processing.

4. The map-data-generation method according to claim 2, wherein determining at least one first upper level link further includes:
   generating, with the first link-determination unit, a list of entering links, each of the entering links going into a divided area;
   generating, with the route-search unit, a second search-start link set from all of the links entering the predetermined divided area, and performing the route-search processing in a backward traveling direction to search for routes extending from the second search-start link set;
   acquiring, with the link-acquisition unit, route links associated with routes obtained through the backward search, where the number of the acquired route links is approximately equivalent to or smaller than a predetermined link number, the predetermined link number denoting the number of links from a route-start link to a predetermined link, and where the number of search branches required to make the route search is approximately equivalent to or larger than a predetermined branch number, and specifying an adjacent link which is the closest to the route-start link of all of the acquired route links as a route-search-start link of the first upper level map; and
   performing the above processing for each of the divided areas.

5. The map-data-generation method according to claim 4, wherein the route-search processing is performed by the route-search unit until the search branch can be extended only with more difficulty than a previous search branch extension, and after the difficulty in extending the search branch increases, a search for each of the routes extending from the second search-start link set is performed on the basis of a result of the route-search processing.

6. The map-data-generation method according to claim 4, wherein determining the upper level links includes:
    generating, with the route-search unit, a first upper level search-start link set for the first level map from all first-upper-level-route-search-start links associated with the predetermined divided area, performing the route-search processing in the backward traveling direction to search for routes extending from the first upper level search-start link set; and
    determining to which of the upper level maps the links obtained from route-search processing belong to on the basis of a distance between a route-start-point link and a route-terminal-point link.

7. The map-data-generation method according to claim 6, wherein the route-search processing is performed by the route-search unit until the search branch can be extended only with more difficulty than a previous search branch extension, and after the difficulty in extending the search branch increases, a search for each route extending from the first upper level search-start-link set is performed on the basis of a result of the route-search processing.

8. The map-data-generation method according to claim 2, wherein determining the upper level links includes:
    creating, with the route-search unit, a first upper level search-start link set associated with the first upper level map, and performing the route-search processing in the forward traveling direction to search for routes extending from the first upper level search-start link set; and
    determining to which of the upper level maps the links obtained from the route-search processing belong to on the basis of a distance between the route-start-point link and a route-terminal-point link.

9. The map-data-generation method according to claim 8, wherein the route-search processing is performed until the search branch can be extended only with more difficulty than a previous search branch extension, and after the difficulty in extending the search branch increases, a search for routes extending from the search-start link set is performed on the basis of a result of the route-search processing.

10. A map-data-generation device configured to generate hierarchical map data by using road link information associated with a reference level map, the device comprising:
    a first link-determination unit configured to determine at least one first upper level link of a first upper level map higher than the reference level map by using the road link information associated with the reference level map, and specify at least one link to function as a route-search-start link of the first upper level map; and
    a second link-determination unit configured to determine upper level links associated with a plurality of upper level maps by using information associated with the first upper level link, each of the plurality of the upper level maps being at a higher level than the first upper level map, and specify at least one link to function as a route-search-start link of each of the plurality of upper level maps; and
    an upper-level-setting unit configured to set a distance range of each of the plurality of upper level maps so that an upper level map to which a predetermined link used to perform the route search belongs can be determined on the basis of a distance between a departure-point link and a destination-point link.

11. The map-data-generation device according to claim 10, wherein the first-step-determination unit includes:
    a list-generation unit configured to divide at least one mesh of the reference level map into divided areas, ensure that the number of links within the divided areas is approximately equivalent to or lower than a predetermined number, and generate a list of leaving links, each of the leaving links exiting a divided area;
    a route-search unit configured to form a search-start link set from all of the links leaving at least one predetermined divided area and perform route-search processing in a forward traveling direction to search for routes extending from the search-start link set; and
    a link-acquisition unit that is configured to acquire route links associated with the routes obtained through the search, where the number of the acquired route links is approximately equivalent to or smaller than a predetermined link number, the predetermined link number denoting the number of links from a route-start link to a predetermined link, and where the number of search branches required to complete the route search is approximately equivalent to or larger than a predetermined branch number, and that is configured to specify an adjacent link which is the closest to the route-start link of all of the acquired route links as a route-search-start link of the first upper level map.

12. The map-data-generation device according to claim 11, wherein the route-search unit performs the route-search processing until the search branch can be extended only with more difficulty than a previous search branch extension, and after the difficulty in extending the search branch increases, a search for routes extending from the search-start-link set is performed on the basis of a result of the route-search processing.

13. The map-data-generation device according to claim 11, wherein, in the first link-determination unit, the list-generation unit generates a list of entering links, each of the entering links going into one of the divided areas, the route-search unit generates a second search-start-link set from all of the links entering the predetermined divided area and performs the route-search processing in a backward traveling direction to search for routes extending from the second search-start-link set, and the link-acquisition unit acquires route links associated with the routes obtained through the backward search, where the number of the acquired route links is approximately equivalent to or smaller than a predetermined link number, the predetermined link number denoting the number of links from a route-start link to a predetermined link, and where the number of search branches required to complete the backward route search is approximately equivalent to or larger than a predetermined branch number, and specifies an adjacent link which is the closest to the route-start link of all of the acquired route links as a second route-search-start link of the first upper level map.

14. The map-data-generation device according to claim 13, wherein the route-search unit performs the route-search processing until the search branch can be extended only with more difficulty than a previous search branch extension, and after the difficulty in extending the search branch increases, a search for routes extending from the second search-start-link set is performed on the basis of a result of the route-search processing.

15. The map-data-generation device according to claim 11, wherein the second link-determination unit includes:
    a route-search unit configured to form the search-start link set from all first-upper-level-route-search-start links associated with the predetermined divided area, and perform the route-search processing to search for routes extending from the search-start link set to all of the first-upper-level-search-start links;

a link-acquisition unit configured to acquire route links associated with the routes obtained through the search, where the number of the acquired route links is approximately equivalent to or smaller than a predetermined link number, the predetermined link number denoting the number of links from a route-start link to a predetermined link, and where the number of search branches required to complete the route search is approximately equivalent to or larger than a predetermined branch number, and that is configured to specify an adjacent link which is the closest to the route-start link of all of the acquired route links as a route-search-start link of a next map level; and a link-level-determination unit configured to determine to which of the upper level maps the links obtained from route-search processing belong to on the basis of a distance between the route-start link and a route-terminal-point link.

16. The map-data-generation device according to claim 15, wherein the route-search unit performs the route-search processing until the search branch can be extended only with more difficulty than a previous search branch extension, and after the difficulty in extending the search branch increases, the route-search unit searches for routes extending from the search-start link set on the basis of a result of the route-search processing.

* * * * *